(12) United States Patent
Wegbreit et al.

(10) Patent No.: US 10,650,608 B2
(45) Date of Patent: *May 12, 2020

(54) SYSTEM AND METHOD FOR CONSTRUCTING A 3D SCENE MODEL FROM AN IMAGE

(75) Inventors: Eliot Leonard Wegbreit, Palo Alto, CA (US); Gregory D. Hager, Baltimore, MD (US)

(73) Assignee: Strider Labs, Inc., Palo Alto, CA (US)

( * ) Notice: Subject to any disclaimer, the term of this patent is extended or adjusted under 35 U.S.C. 154(b) by 2278 days.

This patent is subject to a terminal disclaimer.

(21) Appl. No.: 12/287,315

(22) Filed: Oct. 8, 2008

(65) Prior Publication Data

US 2010/0085358 A1   Apr. 8, 2010

(51) Int. Cl.
*G06T 19/20* (2011.01)
(52) U.S. Cl.
CPC ...... *G06T 19/20* (2013.01); *G06T 2219/2021* (2013.01)
(58) Field of Classification Search
CPC ......... G06T 19/00–19/20; G06T 17/00–17/30; G06T 19/003
See application file for complete search history.

(56) References Cited

U.S. PATENT DOCUMENTS

| | | | |
|---|---|---|---|
| 6,985,620 B2* | 1/2006 | Sawhney et al. | 382/154 |
| 2006/0012198 A1 | 1/2006 | Hager | |
| 2007/0065002 A1* | 3/2007 | Marzell et al. | 382/154 |

OTHER PUBLICATIONS

Herman et al., "Incremental reconstruction of 3D scenes from multiple, complex images", Elsewer Science Publishers; Artificial Intelligence, vol. 30, Issue 3, Dec. 1986, two cover pages and pp. 289-341. (Year: 1986).*
Kuffner et al., "Motion Planning for Humanoid Robots", In Proc. 11th Int'l Symp. of Robotics Research (ISRR 2003), pp. 1-10. ( Year: 2003).*

* cited by examiner

*Primary Examiner* — Brian Werner
(74) *Attorney, Agent, or Firm* — Gard & Kaslow LLP

(57) ABSTRACT

A system and method for constructing a 3D scene model comprising 3D objects and representing a scene, based upon a prior 3D scene model. The method comprises the steps of acquiring an image of the scene; initializing the computed 3D scene model to the prior 3D scene model; and modifying the computed 3D scene model to be consistent with the image. The step of modifying the computed 3D scene models consists of the sub-steps of comparing data of the image with objects of the 3D scene model, resulting in associated data and unassociated data; using the unassociated data to compute new objects that are not in the 3D scene model and adding the new objects to the 3D scene model; and using the associated data to detect objects in the prior 3D scene model that are absent and removing the absent objects from the 3D scene model. The present invention may also be used to construct multiple alternative 3D scene models.

16 Claims, 6 Drawing Sheets

SYSTEM AND METHOD FOR CONSTRUCTING A 3D SCENE MODEL FROM AN IMAGE

FIELD OF THE INVENTION

The present invention relates generally to computer vision and, more particularly, to constructing a 3D scene model from an image of a scene.

BACKGROUND OF THE INVENTION

Various techniques can be used to obtain an image of a scene. The image may be intensity information in one or more spectral bands, range information, or a combination of the two. From such an image, it is useful to compute the full 3D model of the scene. One need for this is in robotic applications where the full 3D scene model is required for path planning, grasping, and other manipulation. In such applications, it is also useful to know which parts of the scene correspond to separate objects that can be moved independently of other objects. Other applications have similar requirements for obtaining a full 3D scene model that includes segmentation into separate parts.

Computing the full 3D scene model from an image of a scene, including segmentation into parts, is referred to here as "constructing a 3D scene model" or alternatively "parsing a scene". There are many difficult problems in doing this. Two of these are: (1) identifying which parts of the image correspond to separate objects; and (2) identifying or maintaining the identity of objects that are partially or fully occluded.

Previously, there has been no entirely satisfactory method for reliably constructing a 3D scene model, in spite of considerable research. Several technical papers provide surveys of a vast body of prior work in the area. One is such survey is Paul J. Besl and Ramesh C. Jain, "Three-dimensional object recognition", *Computing Surveys,* 17(1), pp 75-145, 1985. Another is Roland T. Chin and Charles R. Dyer, "Model-based recognition in robot vision", *ACM Computing Surveys,* 18(1), pp 67-108, 1986. Another is Farshid Arman and J. K. Aggarwal, "Model-based object recognition in dense-range images—a review", *ACM Computing Surveys,* 25(1), pp 5-43, 1993. Another is Richard J. Campbell and Patrick J. Flynn, "A survey of free-form object representation and recognition techniques", *Computer Vision and Image Understanding,* 81(2), pp 166-210, 2001.

None of the prior work solves the problem of constructing a 3D scene model reliably, particularly when the scene is cluttered and there is significant occlusion. Hence, there is a need for a system and method able to do this.

SUMMARY OF THE INVENTION

The present invention provides a method for constructing a 3D scene model comprising 3D objects and representing a scene, based upon a prior 3D scene model. The method comprises the steps of acquiring an image of the scene; initializing the computed 3D scene model to the prior 3D scene model; and modifying the computed 3D scene model to be consistent with the image. The step of modifying the computed 3D scene model consists of the sub-steps of comparing data of the image with objects of the 3D scene model, resulting in associated data and unassociated data; using the unassociated data to compute new objects that are not in the 3D scene model and adding the new objects to the 3D scene model; and using the associated data to detect objects in the prior 3D scene model that are absent and removing the absent objects from the 3D scene model.

The present invention also provides a system for constructing a 3D scene model, comprising one or more computers or other computational devices configured to perform the steps of the various methods. The system may also include one or more cameras for obtaining an image of the scene, and one or more memories or other means of storing data for holding the prior 3D scene model and/or the constructed 3D scene model.

The present invention also provides a computer-readable medium having embodied thereon program instructions for performing the steps of the various methods described herein.

The present invention also provides a method for computing alternative 3D scene models, comprising 3D objects and representing a scene, based upon a set of possible prior 3D scene models. The method comprises the steps of acquiring an image of the scene; initializing the set of alternative 3D scene models to the set of possible prior 3D scene models; determining differences between one or more of the alternative 3D scene models and the image; and modifying one or more of the alternative 3D scene models by adding one or more possible new objects, removing one or more possible absent objects, or both, to compute one or more alternative 3D scene models. The step of determining differences between one or more of the alternative 3D scene models and the image further comprises the substeps of comparing data of the image with objects of the 3D scene model, resulting in associated data and unassociated data; using the unassociated data to compute possible new objects; and using the associated data to detect possible absent objects.

DETAILED DESCRIPTION OF THE INVENTION

Introduction

Figure 1:
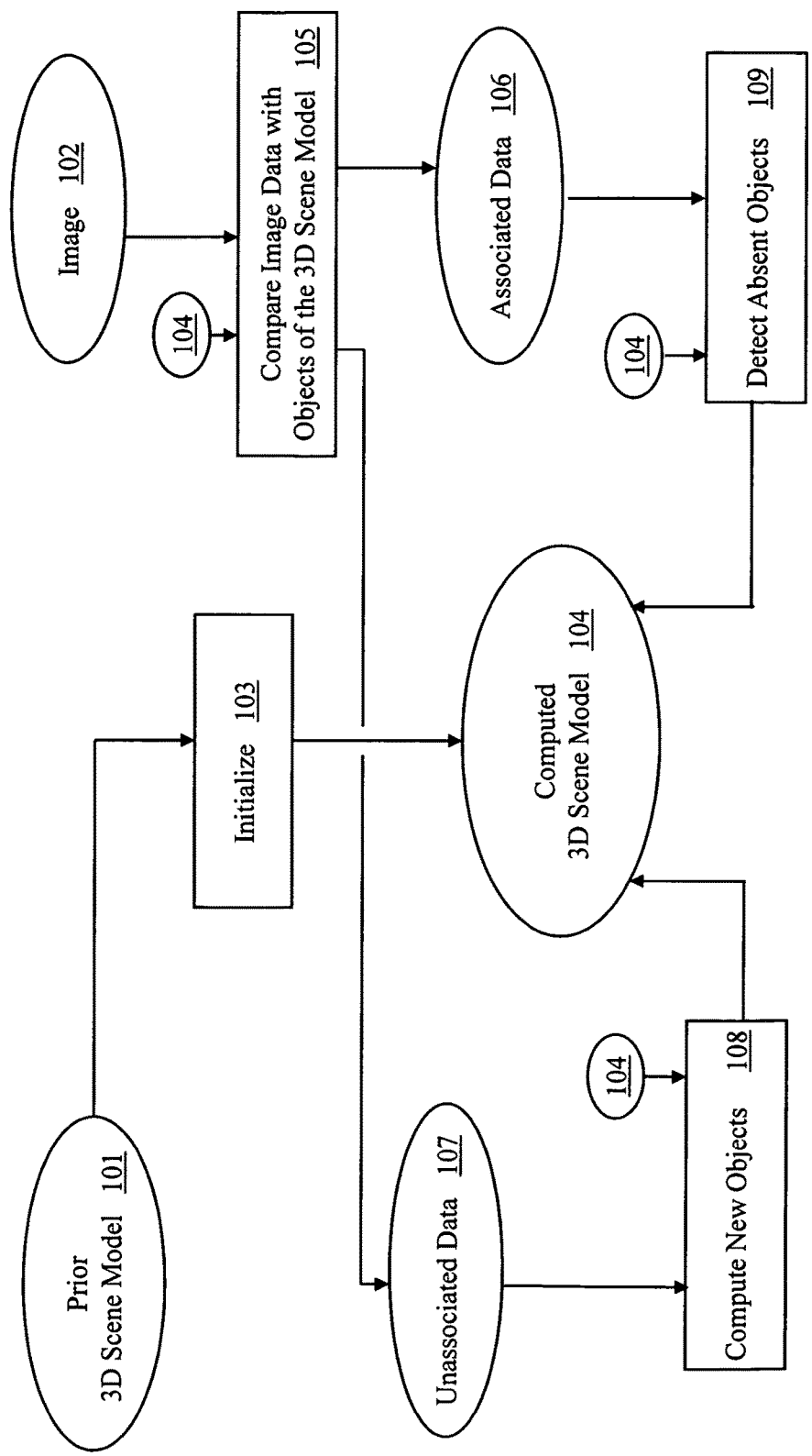
FIG. 1 illustrates the principle operations and data elements used in constructing a 3D scene model from an image of a scene according to an embodiment of the present invention.

The present invention relates to a method for constructing a 3D scene model from an image. One of the innovations of the present invention is the use of a prior 3D scene model to provide additional information. The prior 3D scene model may be obtained in a variety of ways. It can be the result of previous observations, as when observing a scene over time. It can come from a record of how that portion of the world was arranged as last seen, e.g. as when a mobile robot returns to a location for which it has previously constructed a 3D scene model. Alternatively, it can come from a data base of knowledge about how portions of the world are typically arranged. Changes from the prior 3D scene model to the new 3D scene are regarded as a dynamic system.

Additionally, the present invention uses functions that construct models of new 3D objects and refine models of prior 3D objects from local image data. This may be guided by the 3D scene model so as to make efficient use of these functions.

The method of the present invention detects when objects in the prior 3D scene model are absent from the scene: it finds objects inconsistent with the image data and subjects them to additional confirmation tests. This takes into account the fact that an object that was in the prior 3D scene model may not appear in the image either because it is absent or because it is occluded by a new or moved object.

Given a prior 3D scene model, an image, and a model of scene change dynamics, the present invention computes a new 3D scene model which is consistent with the observed image and probable changes to the prior 3D scene model.

Overview

It is convenient to describe the invention in the following order: (1) definitions and notation, (2) principles of the invention, (3) some examples, (4) some general considerations (5) a first embodiment, and (6) various alternative embodiments. One of skill in the art will appreciate that choosing among the embodiments will be based in part upon the desired application.

Definitions and Notation

A physical scene is composed of physical objects. These are represented in a 3D scene model by closed, three-dimensional surfaces. Such a surface is referred to herein as an "3D object instance" or, where there is no ambiguity, a "3D object" or an "object". A 3D object instance is described by its pose parameters (location and orientation). Depending on the type of object, it may additionally described by ancillary parameters describing shape, size, and so forth. Each object instance also has a unique designation, i.e., its name. A 3D scene model is denoted herein by G.

In some embodiments of the present invention, it is convenient to adopt certain related conventions, as follows: There is an unique object, the ground plane. Every object except the ground plane has at least one object supporting it. Additionally, no objects are in collision. The requirements of support and the absence of collision can be used to place constraints on the 3D scene models computed by some embodiments of the present invention.

Implicitly associated with an image is the pose (location and orientation) of the sensor used to acquire the image. Additionally, the image depends on the field of view of the sensor, which is conveniently described by the view frustum. The pose and view frustum are collectively referred to as the "observer description" and denoted by $\Gamma$. Where there is no ambiguity, it is convenient to shorten this and refer to "an observer $\Gamma$."

Given a 3D scene model G, an observer $\Gamma$, and a sensor type, one can compute the image that would be recorded by a sensor of that type from the specified pose and view frustum. This computation is referred to as "rendering"; or when a distinction is to be emphasized, is it referred to as "synthetic rendering". The image resulting from rendering G from $\Gamma$ is denoted by $I^{rend}(G, \Gamma)$.

A range sensor provides depth information, i.e., the distance from the imaging device. For a range sensor, the resulting rendered image is sometimes referred to as a "synthetic range image." In this case, rendering can be carried out using a hardware Z-buffer, which is computationally efficient. Alternatively, the rendering can be carried out by software. A synthetic range image of G from $\Gamma$ is denoted by $R(G, \Gamma)$. The process is referred to as "range rendering."

For a color sensor, "photo-realistic rendering" techniques that are popular in 3D graphics may be used. The field has an extensive literature. The reference work *OpenGL Programming Guide,* Addison-Wesley, 2008, is a contemporary description of such techniques.

The concept of rendering may be generalized to computing, from a 3D scene model, what would be obtained if an image were recorded and subsequently processed in some way. One example of this is "feature-based rendering." Each object has features which are computed and stored with the object. Feature based rendering computes how those features would appear in the 3D scene model to an observer. Occlusion is used to determine which features are visible, but the appearance of features is computed by projection or some other technique.

Hence it is convenient to use "rendering" or "synthetic rendering" to describe the process of computing the information that is expected to appear in the image of a 3D scene model from an observer $\Gamma$ at whatever level is appropriate. Particular examples of "rendering" are range rendering, photo-realistic rendering, and feature-based rendering.

Suppose that a physical scene is correctly described by a 3D scene model G, that the 3D scene model is rendered from an observer $\Gamma$ resulting in a synthetic rendered image, and that an observed image is taken from the same observer position. Then the rendered image should be identical to the observed image except for modeling errors in the renderer and noise errors in the physical sensor.

Consider some object p in a 3D scene model. As described below, the present invention associates image data with objects in the 3D scene model. Let $I_p^{obs}$ be the data associated with p. Consider the part of a rendered image that corresponds to p and denote this by $I^{rend}(G, \Gamma, p)$; this represents the image data one would expect to be "associated" with p if p were at its pose in the physical scene. The present invention uses discrepancies between $I_p^{obs}$ and $I^{rend}(G, \Gamma, p)$ to detect absent objects or objects that have moved.

The present invention also detects data that is not associated with any object. This "unassociated data" is used to detect new objects in the scene, or to detect objects that were previously present but which have changed pose.

Given a prior 3D scene model $G^-$, an observer $\Gamma$, and a sensed image $I^{obs}$, the present invention computes a new 3D scene model $G^+$. In certain applications, it is useful to return additional information describing objects in $G^+$. For example, it may be useful to designate an object as "Unverifiable", meaning that it is present in $G^+$ because it is in $G^-$ and no image data contradicts it, e.g., because it is entirely occluded in $G^+$ when viewed from $\Gamma$. An application using a robotic manipulator might treat Unverifiable objects specially.

During the course of processing, it is also useful to be able to maintain other information related to but ancillary to the 3D scene model. A 3D scene model augmented with such additional information is referred to as "an augmented 3D scene model."

Sensed images have a set of discrete locations. These are denoted by $l \in L$. The value of an observed image at location l is denoted by $I_l^{obs}$.

It is convenient to use the same set of discrete locations and indices for rendered images. If G is rendered from $\Gamma$, the rendered image value at location l is denoted by $I_l^{rend}(G, \Gamma)$.

Let p be an object in a 3D scene model G. The set of locations where p is visible from $\Gamma$ (i.e. in the view frustum and not occluded) in the 3D scene model G is denoted by $L_p = L(G, \Gamma, p)$. The part of the rendered image corresponding to p is $\{I_l^{rend}(G, \Gamma): l \in L_p\}$. This is $I^{rend}(G, \Gamma, p)$.

Principles of the Invention

Given a prior 3D scene model, an image, and a model of how the scene is expected to change, the present invention computes a new 3D scene model which is consistent with the observed image and probable changes to the scene.

In broad outline, the present invention operates as shown in FIG. 1. Operations are shown as rectangles; data elements are shown as ovals. The method takes as input a prior 3D scene model 101 and an image 102, initializes the computed 3D scene model 104 to the prior 3D scene model at 103, and then iteratively modifies the computed 3D scene model as follows. Data of the image is compared with objects of the computed 3D scene model at 105, resulting in associated data 106 and unassociated data 107. From the unassociated data, new objects are computed at 108 and added to the computed 3D scene model. The associated data is used to detect absent objects at 109 and these absent objects are removed from the computed 3D scene model. In each of the computations 105, 108, and 109, both image data and the current computed 3D scene model 104 are used, so that 3D scene consistency is maintained.

Figure 2:
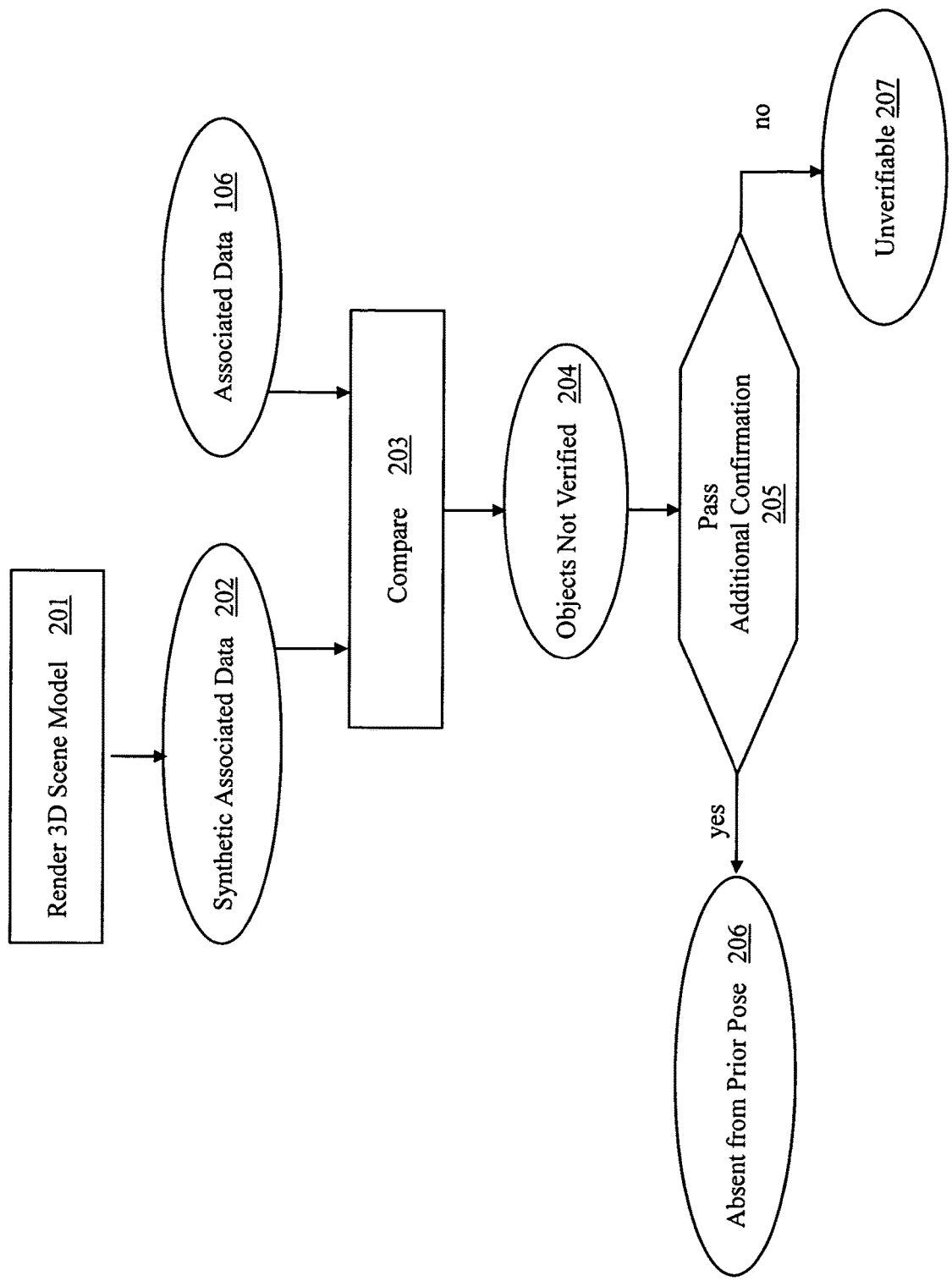
FIG. 2 illustrates the operation of detecting absent objects according to an embodiment of the present invention.

At the next level of detail, detecting absent objects, step 109 in FIG. 1, is performed as shown in FIG. 2. For each object p of the current 3D scene model G, a synthetic rendering, at step 201, is used to compute the synthetic associated data $I^{rend}(G, \Gamma, p)$; this is the data 202 that one would expect to see if p were present as specified and the rest of G were also correct. The associated data from the image is compared at step 203 to the associated data from the synthetic rendering. If the two are not consistent, then p is considered "not verified" by the data at 204; i.e., the object p does not appear in the image in its prior pose. This may be due to either to (i) p being actually absent from its pose in the prior 3D scene model, or (ii) p being occluded by object(s) q that have been added to the physical scene or moved in the physical scene, but which have not yet been incorporated into the current 3D scene model G. Hence, p is subject to additional confirmation at step 205. If it is determined that there are no such objects q, then the second case can be eliminated and the object is confirmed to be absent from its pose in the prior 3D scene model at 206. Such an object is either identified with a new object found elsewhere or removed from the computed 3D scene model as being truly absent. If the object p fails the additional confirmation, it is labeled Unverifiable at 207, because neither its presence nor absence can be determined from the image. It remains in the 3D scene model with the label Unverifiable.

There are various ways in which it can be determined that there are no such occluding or moved object(s) q. The First Embodiment uses one technique. It makes multiple passes on the data; when it first finds an object not verified by the data, it places the object in a special state and continues processing until it has found and added to the scene all new objects and adjusted the pose of all objects. Subsequent to that, p is known to be either occluded or absent from its pose in the prior 3D scene model. The Alternative Embodiments describe other techniques. One alternative technique is to process the 3D scene model and new image data in front to back order so as to find new occluding objects before processing the objects they would occlude.

More generally, the iterative process of modifying the computed 3D scene model makes choices as to the order in which to make the modifications and how to interpret the image data as objects. This can be regarded as a problem of searching over the possible modifications to find 3D scene models with high likelihood. There are many ways of searching and many variations on each. Several search techniques are described in the Alternative Embodiments.

EXAMPLES

Some examples will illustrate the utility of the present invention, showing the results computed by typical embodiments.

Suppose there is a scene with an object $p_l$. Subsequently, an object $p_f$ is placed in front of $p_l$, occluding it from direct observation from the imaging device. Then an image of the scene is acquired. Persistence suggests that $p_l$ has remained where it was, even though it appears nowhere in the image, and this persistence is expressed in the dynamic model. The present invention computes a new 3D scene model in which the occluded object remains present and designated as Unverifiable, meaning that the image data neither confirms nor contradicts its presence. Using a prior 3D scene model allows the method to retain hidden state, possibly over a long duration in which the object cannot be observed.

Suppose there is a scene with an upright cylinder $p_c$. Subsequently, a second cylinder $p_d$ of identical radius and visual appearance is placed on it. An image is acquired showing $p_c$ and $p_d$ fused as one. Persistence suggests that $p_c$ remains where it was and a new object $p_d$ has been added to the scene. The present invention computes a 3D scene model with distinct objects $p_c$ and $p_d$. Using a prior 3D scene model allows the method to segment the scene even though the image data does not provide sufficient information to do so. In this way, complex scenes can be built up sequentially with object segmentation retained.

Suppose there is a scene with a prone cylinder $p_c$. Subsequently, an object $p_f$ is placed in front of it, occluding the middle. The image shows $p_f$ in the foreground and two cylinder segments behind it. Persistence suggests that the two cylinder segments are the ends of cylinder $p_c$. The present invention computes a new 3D scene model with $p_c$ where it was and $p_f$ in front of it. Using a prior 3D scene model allows the method to assign two image segments to a common 3D object.

Suppose there is a scene with an object $p_f$. Subsequently, $p_f$ is moved to a new pose. The image shows data consistent with $p_f$ but with changed pose. Persistence suggests that $p_f$ has been moved and this persistence is expressed in the dynamic model. The present invention computes a new 3D scene model in which object $p_f$ has been moved to a new pose. Using a prior 3D scene model and a dynamic model allows the method to maintain object identity over time.

In each case, there are alternative 3D scene models consistent with the image. In the first, the object $p_c$ could be absent; in the fourth it is possible that object $p_f$ has been removed and a similar object $p_F$ added. In each case, the prior 3D scene model and the model of scene change dynamics make the alternative less likely.

Object Models

The object instances in a 3D scene model may be of various types. One type is parameterized shape models, e.g. spheres, cylinders, cuboids, or superquadrics. A second type is arbitrarily-shaped object instances that match object models in a library of object models. In this case, each model in the library describes a specific object. Recognizing object instances found in such a library is referred to as "object recognition", see Chapter 10 of E. Trucco and A. Verri, *Introductory Techniques for 3-D Computer Vision*, Prentice Hall, 1998; also see Shimon Ullman, *High-level Vision*, The MIT Press, 1997 A third type is arbitrarily-shaped object instances that match class models in a library of class models. In this case, each model in the library describes a class of related objects, e.g. chairs, trucks, cars, barns, etc. Such a class model is sometimes called a "class prototype". In various embodiments, the present invention can be applied to each of these types of object instances, as described below.

Common Computational Issues

Certain computational issues are common to multiple embodiments.

One is computing visibility. In this computation, it is convenient to choose the viewing frustum of $\Gamma$ so that the far extent of the view frustum is beyond any object in the 3D scene model other than the ground plane. Let $R^{far}$ be the distance from the origin of pose $\Gamma$ to the far extent of the view frustum. Let p be an object in the 3D scene model other than the ground plane. The set of locations where p would be visible if there were no other objects is denoted by $K_p$. It may be computed as follows. A synthetic range map of a 3D scene model consisting only of p is computed from observer $\Gamma$; this is denoted by $R(p, \Gamma)$. Then $K_p$ is computed as $$K_p = \{l \in L : R_l(p,\Gamma) < R^{far}\} \quad (1)$$

The size of $K_p$ is denoted by $N_p$. It is the number of locations where p would be visible from $\Gamma$ if there were no other objects in the 3D scene model.

Another computational issue is that of computing $L_p$, the set of locations where p is visible from $\Gamma$ in the 3D scene model G. This may be done as follows. A synthetic range map of G from $\Gamma$ is computed; this is denoted by $R(G, \Gamma)$. $L_p$ is the set of locations where no other object occludes p from $\Gamma$, i.e.

$$L_p = \{l \in K_p : R_l(p,\Gamma) \leq R_l(G,\Gamma)\} \quad (2)$$

The size of $L_p$ is denoted by $n_p$. It is the number of locations where p is visible in the 3D scene model. Clearly, $L_p \subseteq K_p$ and $n_p \leq N_p$. If $n_p = N_p$ the object is said to be completely visible.

Note that these visibility computations are properties of the scene model G and observer $\Gamma$; they are independent of the type of sensor used to acquire the image.

Specific embodiments may modify the definition of $L_p$ for specific needs. For example, an embodiment may mark an object as "Ephemeral", meaning that it is not to be considered as visible. When computing $L_p$, an Ephemeral object has no visible locations and occludes no other object.

Another computational issue is computing geometric constraints in certain embodiments of the present invention. In such embodiments, objects in a 3D scene model may not intersect, i.e. the computed poses and object parameters must be consistent with this. Additionally, all objects with the exception of a distinguished ground plane must be supported, i.e., must be in contact with at least one object below it. Collision detection is a well-studied topic with an extensive technical literature. A survey paper is Ming C. Lin, Stefan Gottschalk, "Collision detection between geometric models: A survey", *Proc. of IMA Conference on Mathematics of Surfaces*, 1998. Books on the subject include, Gino van den Bergen, *Collision Detection in Interactive 3D Environments*, Elsevier, 2003 and Christer Ericson, *Real Time Collision Detection*, Elsevier, 2005.

In various embodiments of the present invention, standard collision detection techniques are used to
(1) verify that objects are not in collision,
(2) compute the displacement that will take one object out of collision with another object,
(3) compute the displacement that will take bring one object into contact with another object.

First Embodiment

Overview

In the first embodiment, search is carried out by a method designated herein as the SY Algorithm described in detail below. This is a multi-pass algorithm that makes several sweeps of the 3D scene model where each sweep makes a particular class of decision. The SY Algorithm has various embodiments, each of which can be applied to various kinds of image data and various kinds of object models.

In the first embodiment, the image is a range image and the object models are of basic solids: spheres, cylinders, and cuboids. These are general class models and the function that computes new object instances determines the pose and class parameters from the image data.

In the first embodiment, the 3D scene model consists of 3D object models and a graph structure representing object support relationships. A 3D scene model does not allow object models to be in collision. All 3D objects have a unique name represented as a string of characters.

The augmented 3D scene model carries two pieces of information about each object instance:
(1) A "label" indicating the classification status of the object.
(2) A "marking" indicating whether the object should participate in certain computations as further described below. If the object should not participate, it is said to be marked Ephemeral, otherwise it is said to be marked Substantial.

It is convenient to describe the first embodiment in the following order: (1) An abstract description of the data-dependent functions used by the SY Algorithm, (2) the Object Classifier function, (3) the Graph Sweep function, (4) the body of the SY Algorithm, (5) considerations specific to range data and basic solids, (6) geometric functions.

Figure 3:
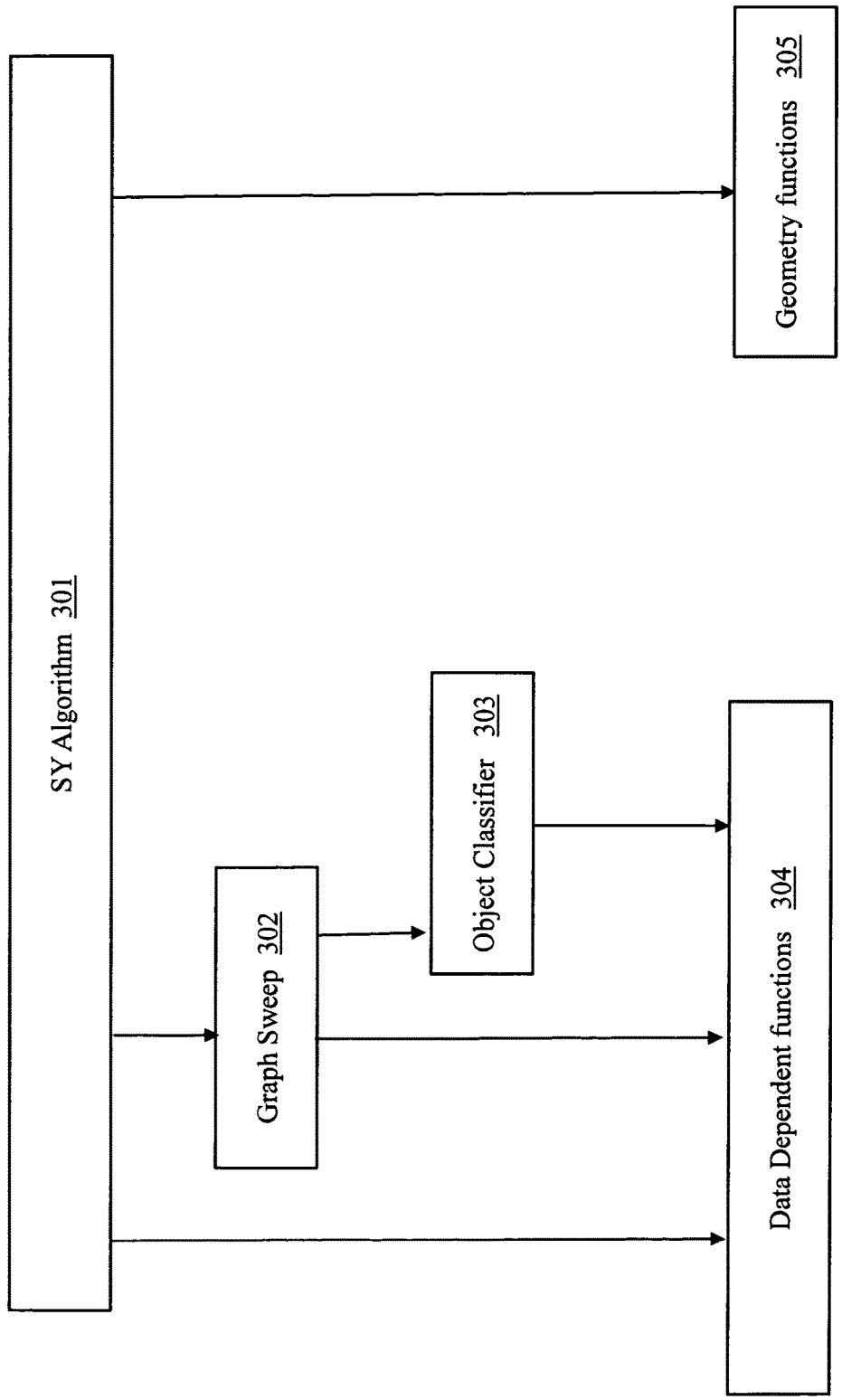
FIG. 3 illustrates the relationship of a main algorithm and supporting functions of a method for constructing a 3D scene model from an image of a scene according to an embodiment of the present invention.

FIG. 3 shows the relationship of these components. The SY Algorithm 301 is the main algorithm. It calls the Graph Sweep function 302, which calls the Object Classifier 303, which calls various data-dependent functions 304. There are also direct calls to the data dependent functions from the SY Algorithms and the Graph Sweep function. Also, the SY Algorithm calls the geometric functions 305.

The Dynamic Model

In the first embodiment, the dynamic model allows objects to be added to a scene, removed from a scene, or to remain in a scene but with a different pose. If the change in pose is large, it may be difficult to determine if this is the same object at a different pose, or a new object entirely. The dynamic model makes the following assumption about how 3D scene models change over time:

Object Identity: Suppose an object $B_1$ is present in the prior 3D scene model. Suppose $B_1$ is not found in the image and a new object $B_2$ of similar appearance is found in the image. Then $B_2$ is taken to be the same object as $B_1$ and is identified as such in the computed 3D scene model.

It is convenient to implement this assumption in two different places in the operation of the first embodiment:
(1) If two objects of the same size and shape overlap in the prior 3D scene model and the computed scene model, then they are identified with each other.
(2) If a new object is detected in the computed 3D scene model which is the same size and shape as an object that is detected as absent in the computed 3D scene model, the new object and the absent object are identified with each other.

The first is a special case of the second, but certain computational efficiencies result from singling it out.

Data Dependent Functions

The SY Algorithm can be applied to any image type for which the following data-dependent functions can be produced:

Sufficiently Visible. Given a 3D scene model, a distinguished object, and an observer Γ, this function decides whether enough of the object is visible from the observer to decide if the object is present or absent. The analysis considers the occlusion of the object by other objects that are not marked Ephemeral and clipping by the viewing frustum, as well as other considerations depending on the image type. For example, if an object is totally occluded, no decision can be made and the function returns false.

Data Association. This is related to step 105 of FIG. 1. Given a 3D scene model and an observed image, this function compares image data with objects of the 3D scene model, associates data of the image to objects, and also computes a measure of the quality of the association.

Object Presence Test. This is related to step 203 of FIG. 2. Given an object, data associated with the object, and a 3D scene model, this function determines if the object can be verified from the data as being present at its pose in the 3D scene model. If not, the object does not appear in the image in its prior pose.

Detect and Cluster. Given observed data, this function locates data that cannot be associated with objects of a 3D scene model, creates clusters of the unassociated data, and returns the clusters.

Compute New Objects. This is related to step 108 of FIG. 1. Given observed data and proposed support relationships, this function computes an object instance corresponding to the data. It computes the object's pose and, in the case of parametric models, it also computes parametric information about the object such as the size or shape. It also a computes a quality measure of the resulting model. The function reports failure if it is not able to compute an object instance of adequate quality.

Support for Data Cluster. Given observed data and a 3D scene model, this function computes a set of possible supporting objects for a model that would be computed from the data.

Model with Support. Given observed data and a 3D scene model, this function computes new objects while taking support relationships from the 3D scene model into account. It uses functions Support For Data Cluster and Compute New Objects above.

Adjust Existing Object. Given an existing object instance, observed data associated with the object, and support relationships for the object, this function computes an updated pose for the object and possibly other object parameters.

Identify Objects. Given two object instances and a 3D scene model containing the second, this function returns true if the second object instance can be plausibly interpreted as the result of moving the first object to a new pose. It may also return a measure of the likelihood.

Object Classifier

The Object Classifier 303 of FIG. 3 makes local decisions about the status of an object instance. The possible classification states are:
1. New Object
2. Present at a New Pose
3. Present at the Same Pose
4. Present with Updated Pose
5. Not Verified
6. Unverifiable
7. Unprocessed When an object is classified in one of these states, the object is said to be "labeled" with the classification.

Figure 4:
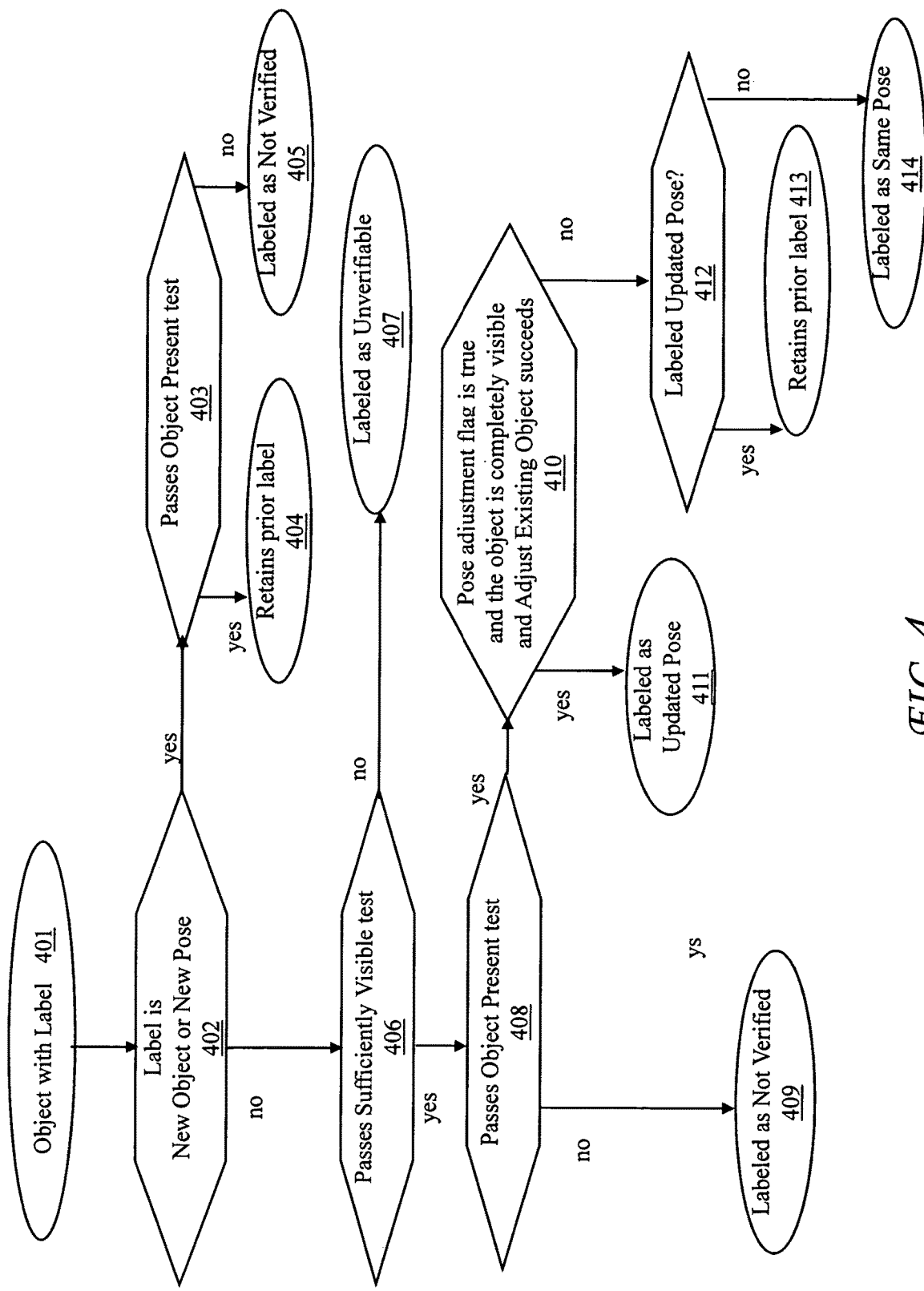
FIG. 4 illustrates the Object Classifier function according to an embodiment of the present invention.

The Object Classifier 303 operates on an augmented 3D scene model and takes a pose adjustment flag controlling its operation, as explained below. It considers each object and the data associated with that object. It either confirms the object's label or assigns a new label via the steps shown in FIG. 4.

The input 401 includes an object with a label. In step 402, that label is tested. If the label is New Object or New Pose, the Object Presence test 403 is called, using the data associated with the object. An object that passes the Object Presence test retains its prior label at 404; an object that fails the Object Presence test is labeled Not Verified at 405, i.e., the object does not appear in the image in its prior pose.

If the label is neither New Object nor New Pose, the Sufficiently Visible test is called at step 406. An object that fails the Sufficiently Visible test is labeled Unverifiable at 407. An object that passes the Sufficiently Visible test is subjected to the Object Presence test 408. An Object that fails the Object Presence test is labeled Not Verified at 409, and provides the result at 204 in FIG. 2; the object does not appear in the image in its prior pose.

If an object passes the Object Presence test, further tests are performed at step 410, as follows: if the pose adjustment flag is true and the object is completely visible, the Adjust Existing Object function is called with the data associated with the object and its support relationships in the 3D scene model. If the function succeeds, the object's pose is adjusted and the object is labeled Updated Pose at 411.

If the pose adjustment flag is false, or the object is not completely visible, or the Adjust Existing Object function fails, the object label is tested at step 412. If it is Updated Pose, that label is retained at 413; otherwise the object is labeled as Same Pose at 414.

Graph Sweep

The Graph Sweep function 302 of FIG. 3 operates on all object instances marked Substantial in an augmented 3D scene model, the data acquired from an image, and flags controlling its operation. It performs three central activities: (1) it associates data to object instances marked Substantial in the augmented 3D scene model, (2) it labels object instances that are marked Substantial in the augmented 3D scene model, and (3) it clusters data that is not associated with objects in the current 3D scene model.

Figure 5:
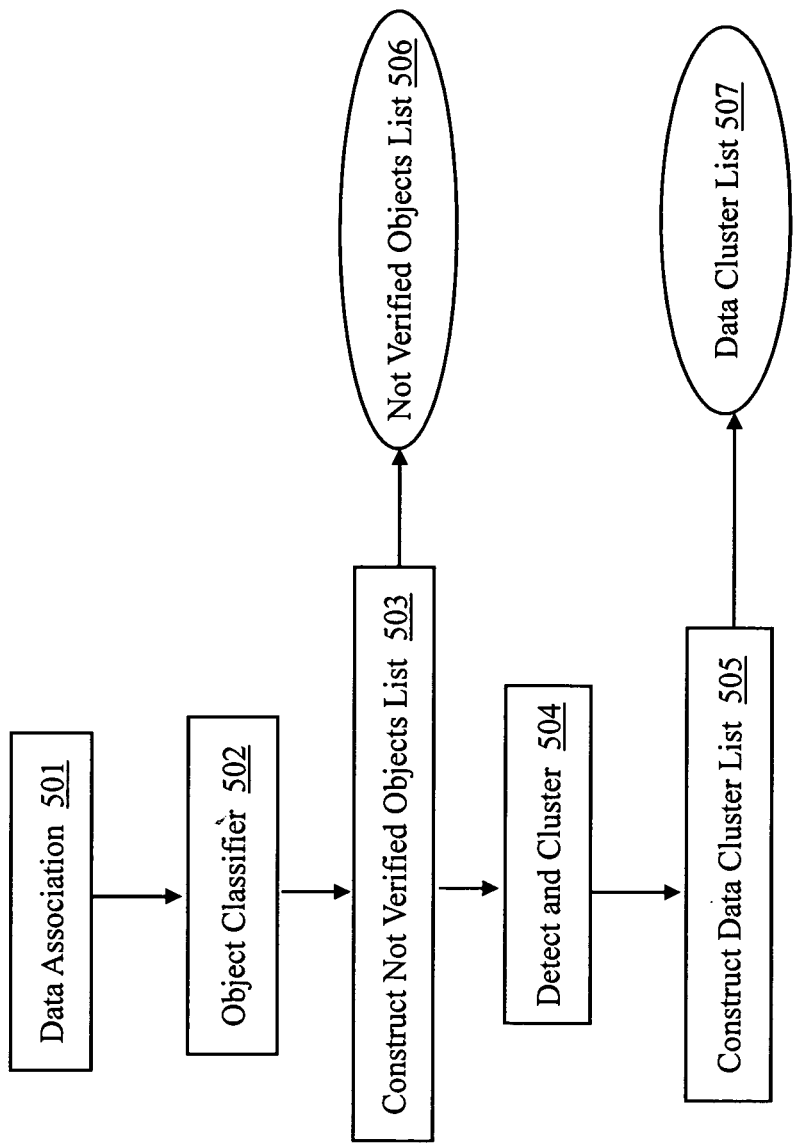
FIG. 5 illustrates the Graph Sweep function according an embodiment of the present invention.

The operation of the Graph Sweep function is shown schematically in FIG. 5.

(1) For each object marked Substantial, it calls the Data Association function at step 501, and stores the associated data in the augmented 3D scene model.
(2) For each object marked Substantial and its associated data, it calls the Object Classifier at step 502 to re-label the object.
(3) It constructs a list of all objects in the augmented 3D Scene model labeled Not Verified at step 503. This list is referred to as the Not Verified Objects List, shown at 506.
(4) It calls the Detect and Cluster function at step 504 to find and cluster data that was not associated with objects by the Data Association function.
(5) It constructs a list of these clusters at step 505. This list is referred to as the Data Cluster List 507.

The Not Verified Objects List, the Data Cluster List, and the updated augmented 3D scene model are collectively the results of the Graph Sweep function. If, at the end of the Graph Sweep, the Not Verified Objects List contains no objects that are marked Substantial and the Data Cluster List is empty, the augmented 3D scene model is said to be "Confirmed."

Body of the SY Algorithm

The SY Algorithm employs the Graph Sweep function to make classes of decisions in a multi-phase fashion. During each phase or "step", the complete 3D scene model is evaluated and, based on the result, the 3D scene model is modified.

The algorithm maintains three items as it operates:
1. An augmented 3D scene model, referred to as the "current 3D scene model."
2. A Not Verified Objects List from the most recent Graph Sweep on the current 3D scene model.
3. A Data Cluster List from the most recent Graph Sweep on the current 3D scene model.

At the start, the SY Algorithm takes the prior 3D scene model and creates an augmented 3D scene model by labeling each object instance as "Unprocessed" and marking each object instance as Substantial. This augmented 3D scene model is taken as the current 3D scene model.

Figure 6:
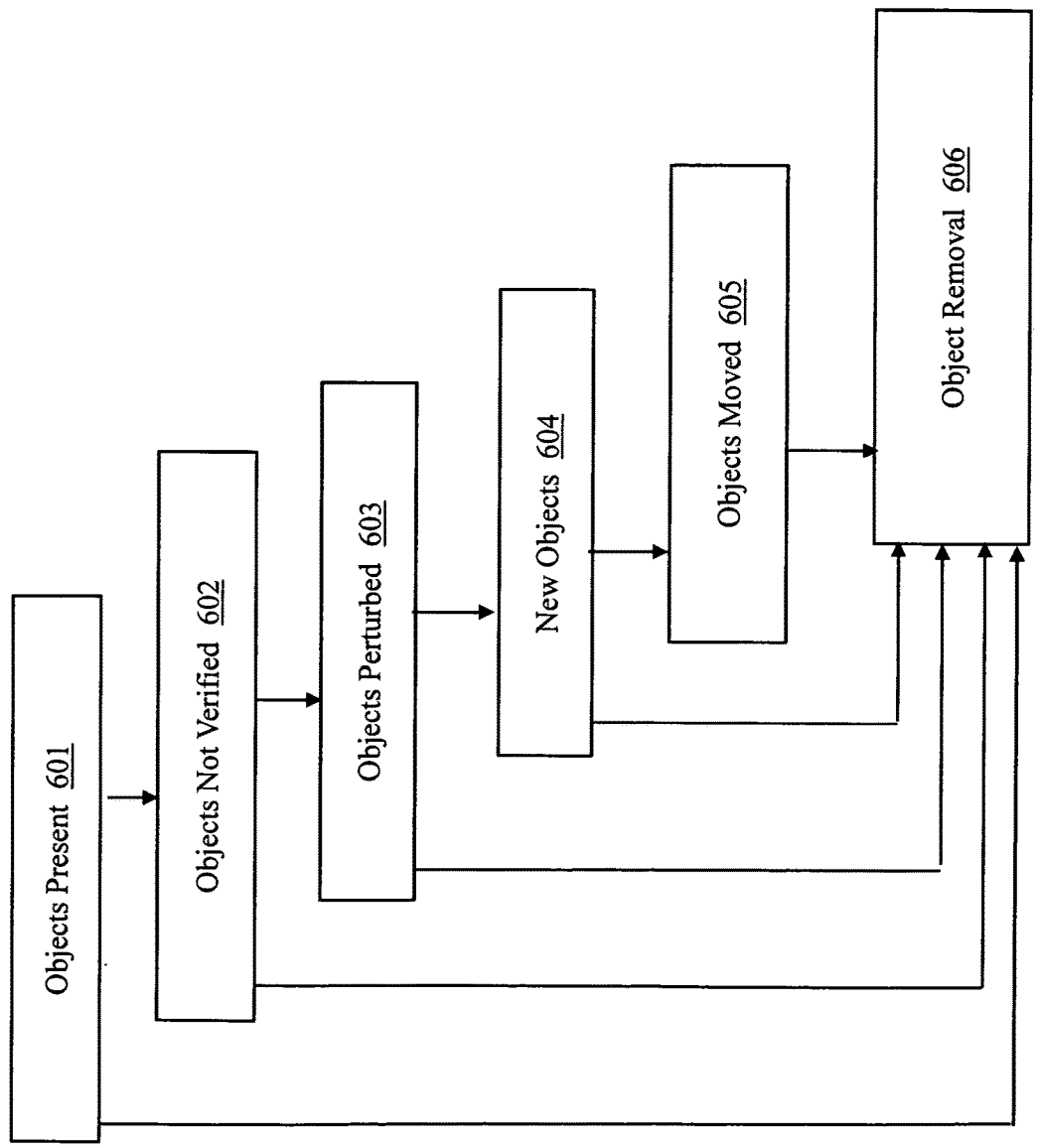
FIG. 6 illustrates the SY Algorithm according an embodiment of the present invention.

The major steps of the SY Algorithm are shown in FIG. 6. Step 601 validates the portions of the current 3D scene model for which there is no ambiguity; if this accounts for all the image data and all the objects, control proceeds to step 606. Step 602 processes objects labeled Not Verified; those that pass certain tests are marked Ephemeral. If all the image data and all the objects are accounted for, control proceeds to step 606. Step 603 handles objects whose pose has changed, but whose rendering largely overlaps with its rendering at its old pose; it computes the new pose from the image data. Again, if all the image data and all the objects are accounted for, control proceeds to step 606. Step 604 considers the clusters of unassociated data, from which it computes new objects and adds them to the current 3D scene model, as shown in step 108 of FIG. 1. If all the image data and all the objects are accounted for, control proceeds to step 606. Step 605 attempts to find objects that have moved by identifying objects marked Not Verified with new objects where they match, and proceeds to step 606. Step 606 removes objects that are marked Not Verified from the current 3D scene model.

In greater detail, the six steps are as follows:

Step 601 (Objects Present): This step validates the portions of the current 3D scene model for which there is no ambiguity. A Graph Sweep is performed on the current 3D scene model with the pose adjustment flag set so that no pose adjustment is allowed. If the current 3D scene model is Confirmed, the Algorithm moves directly to step 606. If the current 3D scene model is not Confirmed, a second Graph Sweep on the current 3D scene model is performed, with the pose adjustment flag set so that pose adjustment is allowed. If the current 3D scene model is Confirmed in this Graph Sweep, the Algorithm moves directly to step 606.

Step 602 (Objects Not Verified): This step processes objects labeled Not Verified. Those that pass certain tests are marked Ephemeral. (Later steps of the computation will subject these objects to further tests to confirm their actual status) If no object instances appear on the Not Verified Objects List after step 601 execution moves to step 603.

If object instances appear on the Not Verified Objects List after step 601, the Not Verified Objects List and Data Cluster List after step 601 are recorded for later reference. Then, the following operations are performed on each object instance appearing in the Not Verified Objects List:

1. The object instance is marked Ephemeral in the current 3D scene model, creating a modified 3D scene model.
2. A Graph Sweep is performed on the modified 3D scene model.
3. The results of the Graph Sweep on the modified 3D scene model are compared with the results of the Graph Sweep on the current 3D scene model after step 601 to see if the following conditions are satisfied:
   (a) The number of data points appearing in the Data Cluster List resulting from the modified 3D scene model is no larger than the number of data points that appear in the Data Cluster List of the current 3D scene model.
   (b) The number of object instances on the Not Verified Object List resulting from the modified 3D scene model is no larger than the number of objects that appeared on the Not Verified Objects List of the current 3D scene model.
4. If the object instance passes these two tests, it is added to a list of objects to be marked Ephemeral.

After all object instances appearing on the Object Absence List after step 601 are processed, any object that appears on the list of objects to be marked Ephemeral is put into a special state by marking it Ephemeral in the current 3D scene model. The result is a modified 3D scene model. This modified 3D scene model becomes the current 3D scene model.

A Graph Sweep is performed on the current 3D scene model. If the current 3D scene model is Confirmed, the Algorithm moves directly to step 606.

If the current 3D scene model is not Confirmed, execution proceeds to step 603.

Step 603 (Objects Perturbed): Step 603 handles cases where an object instance's pose has changed, but it is still largely overlapping with its old pose.

If no object instances marked Substantial appear on the Not Verified Objects List for the current 3D scene model, execution moves to step 604.

If the Not Verified Objects List for the current 3D scene model contains object instances that are marked Substantial, the list of objects appearing on the Not Verified Objects List is recorded in a new list C. The following steps are then performed for each object instance p marked Substantial appearing on C:

1. The data associated with p in the current 3D scene model is recorded as the set $B_p$. A modified 3D scene model is produced by marking p as Ephemeral in the current 3D scene model.
2. Graph Sweep is called on the modified 3D scene model, resulting in a Data Cluster List for the modified 3D scene model.
3. The element A of the Data Cluster List for the modified 3D scene model is located such that $A \cap B_p$ is as large as possible. If $A \subseteq B_p$, the data cluster does not contain data items other than those that were originally associated with p. In this case the modified 3D scene model is discarded and the Algorithm continues to the next Not Verified object instance marked Substantial appearing on C.
4. If A is not a subset of $B_p$, the Compute New Objects function is called with: (a) the data cluster A; and (b) the supporting object instances for p in the current 3D scene model. If Compute New Objects fails, the modified 3D scene model is discarded and the Algorithm continues to the next Not Verified object instance marked Substantial appearing on C.

5. If Compute New Objects succeeds, call the new model q. If p and q do not satisfy the Identify Objects test, the modified 3D scene model is discarded and the Algorithm continues to the next Not Verified object instance marked Substantial appearing on C.
6. If p and q satisfy the Identify Objects test, p is modified to appear in the 3D scene model at the pose that was computed for q. The object instance p is labeled Present at a New Pose and it is marked Substantial. Graph Sweep is called on the modified 3D scene model now containing p at a new pose.
7. The results of the Graph Sweep on the modified 3D scene model containing p at a new pose are tested for four conditions: 1) p does not appear on the Not Verified Objects List; 2) the Not Verified Objects List has no members than did not appear on C; 3) p at a new pose is not in collision with any other object instance in the 3D scene model marked Substantial; and 4) the Data Cluster List of the modified 3D scene model containing p at a new pose contains fewer data points than the Data Cluster List of the current 3D scene model. If all four conditions are satisfied, the modified 3D scene model becomes the current 3D scene model. The algorithm continues with the next Not Verified object instance marked Substantial appearing on C.
8. If any of the four conditions of step 7 above are not satisfied, the modified 3D scene model is discarded and the Algorithm continues to the next Not Verified object instance marked Substantial appearing on C.

After all object instances on C which are marked Substantial have been processed, each cluster in the Data Cluster List for the current 3D scene model is considered to be a new object. If there are no clusters on the Data Cluster List, processing moves to step 606, otherwise processing moves to step 604.

Step 604 (New Objects): In this step, data segments on the Data Cluster List for the current 3D scene model are modeled and are added to the current 3D scene model.

Step 604 operates on each data cluster in the Data Cluster list as follows:
1. The Model with Support function is called on the data cluster. If this function fails, processing on this data cluster is terminated.
2. If Model with Support returns a model, a new object instance is created from the model. The Adjust for Adjacent function is called to compute a pose displacement required to place the new object instance in contact with its supports and out of collision with all other objects.
3. Define an Allowable pose displacement to be one that is within a fixed margin and which causes the object instance to be collision free of all objects except objects labeled Not Verified or marked Ephemeral. If there is an Allowable pose displacement, the pose of the new object instance is adjusted and the object instance is added to the current 3D scene model. The new object instance is labeled as a New Object and it is marked Substantial.
4. If there is no Allowable pose displacement, then the modeling of this data cluster is deemed to have failed and the new object instance is discarded.

After modeling all data clusters, all objects in the current 3D scene model that are marked Ephemeral are labeled Not Verified and are marked Substantial. The Collision Check function is called on all Not Verified objects in the current 3D scene model, and those that are in collision are marked Ephemeral.

Graph Sweep is called on the current 3D scene model. Any data clusters computed during this sweep are deemed spurious and ignored. If there are no object instances on the Not Verified Objects List, execution moves to step 606, otherwise execution moves to step 605.

Consider the case where an object is Not Verified prior to this call on Graph Sweep, refer to 204 of FIG. 2. If it fails the Sufficiently Visible test in this call to Graph Sweep, it has failed to pass the additional confirmation operation of 205 in FIG. 2, and is labeled Unverifiable, 207.

Step 605 (Objects Moved): Let M be the Not Verified Objects List. Let N be the list of all object instances in the current 3D scene model that are labeled New Object. For each member of n of N, the following steps are performed:
1. Each member m of M is compared with n using the Identify Objects test.
2. If no pair (m, n) passes this test, the computation continues with the next member of N.
3. If a single member of m of M passes the test with object n, then m is given the pose of n and m is labeled as having a New Pose and is marked Substantial. The object n is removed from the current 3D scene model. The object instance m is removed from M and the computation continues with the next member of N.
4. If more than one member of M passes the test, one of the matching object instances, m, is arbitrarily chosen. The chosen m is given the pose of n and m is labeled as having a New Pose and is marked Substantial. The object n is removed from the current 3D scene model. The object instance m is removed from M and the computation continues with the next member of N.

After all object instances labeled New Object have been processed, Graph Sweep is called on the current 3D scene model and execution moves to step 606.

Step 606 (Object Removal): All object instances that are labeled Not Verified in the current 3D scene model have passed the additional confirmation tests, as shown in step 205 of FIG.2, and they are detected as absent. They are removed from the current 3D scene model, resulting in the final augmented 3D scene model.

The SY Algorithm returns the final augmented 3D scene model as the result of its computation and terminates.

Range Data

In the first embodiment, the image is a range map. Thus, every image location contains a depth value. Equivalently, each range value can also be thought of as a point $t \in R^3$.

For the specific case of range data, the only uncertainly is in the depth direction. The range error is modeled as a combination of a Gaussian distribution with known variance $\sigma^2$ and a uniform distribution modeling some percentage $\beta$ of spurious values. Thus, a range error r has probability density value:

$$P_\beta(r) = (1-\beta)Z(r/\sigma) + \beta U(r; r_{min}, r_{max}) \qquad (3)$$

where $r_{min}$ and $r_{max}$ are the range bounds of the system, Z is the zero mean, unit variance Gaussian density function, and U is a uniform density function over the interval $[r_{min}, r_{max}]$. In the first embodiment, $\sigma$ is computed by presenting the range sensor objects for which it works well, fitting models to the objects in the scene, and computing the root-mean-square error of the resulting fit. The value of $\beta$ is empirically chosen to account for the percentage of spurious data that is expected to be encountered on an object in a typical scene.

In the first embodiment, each object instance in the 3D scene model is a closed surface. Each such surface is associated with a signed Euclidean distance function E, with parameters $\mu$ that map range points to signed distances from the object surface. For a point $t \in R^3$, $E(\mu, t)<0$ indicates that t is inside the object instance, $E(\mu, t)>0$ indicates it is outside the object instance, and $E(\mu, t)=0$ defines the surface of the object instance.

Sufficiently Visible

The Sufficiently Visible test is computed for an object instance p in a 3D scene model G from observer Γ as follows. Let $n_p$ be the size of $L_p$, the observable locations of p in G from observer Γ. Let $N_p$ be the number of observable locations of p in the 3D scene model containing only p at the same pose from observer Γ. The Sufficiently Visible test succeeds if and only if $n_p > 0.8\ N_p$.

Data Association

Data association is computed for object instances marked Substantial. For an object instance p with signed distance function $E(\mu_p, t)$, the data points associated with p are those points t that satisfy two conditions:

1) t falls within a distance τ of the surface of p, i.e. $|E(\mu_p, t)| \le \tau$
2) there is no other object instance q in G that is marked Substantial for which $|E(\mu_q, t)| < |E(\mu_p, t)|$.

The first embodiment performs these operations in two steps. In the first step, for each location $l \in L$, the method computes an object p such that $|E(\mu_p, R_l^{obs})| \le |E(\mu_q, R_l^{obs})|$ for all object instances q that are marked Substantial in G. The object p is stored in an array M at location $M_l$. In the second step, the set of image locations associated with p is computed as:

$$A_p = \{l \in L : |M_l = p\ \text{and}\ E(\mu_p, R_l^{obs})| \le \tau\} \quad (4)$$

The first embodiment uses τ=3 σ, where σ is the standard deviation of equation (3). The quality of the data association is the distance of a data point to the object to which it is associated.

The signed distance function E is defined for three shapes: spheres, cylinders, and cuboids. Let $t=(x,y,z)^T$. For a sphere with radius r and center $c=(c_x; c_y; c_z)^T$, the signed distance function is $$E_S(c,r;t) = \mathrm{sqrt}((x-c_x)^2 + (y-c_y)^2 + (z-c_z)^2) - r \quad (5)$$

For a cylinder with height h, radius r, center $c=(c_x; c_y; c_z)^T$ and orientation described by rotation R, the signed distance function is $$E_C(c,R,h,r;t) = \max(\mathrm{sqrt}(x'^2+y'^2)-r, |z'|-h/2) \quad (6)$$

where $(x',y',z')^T = R^T(t-c)$.

For a cuboid with center c, orientation described by rotation R, and dimensions $d=(d_x, d_y, d_z)^T$ the signed distance function is $$E_B(c,R,d;t) = \max(|x'|-d_x/2, |y'|-d_y/2, |z'|-d_z/2) \quad (7)$$

where $(x',y',z')^T = R^T(t-c)$.

Object Presence Test

Referring to step 203 of FIG. 2, to test an object instance p for object presence, the set of locations $A_p$ associated with p is computed. Let $m_p = |A_p|$. Let $n_p$ be the number of image locations of p that are visible in the synthetic rendered 3D scene model, i.e. $n_p = |L_p|$. The count $n_p$ gives the expectation of associated data based on the 3D scene model. The Object Present test succeeds if $m_p > 0.8\ n_p$. If the Object Presence Test fails, the object is not verified, as discussed with reference to 204 of FIG. 2.

Detect and Cluster

A range image location $l \in L$ in a range image R is unassociated to a 3D scene model G if there is no object instance p in G such that $l \in A_p$. Let U denote the set of all such unassociated locations l in R.

U is analyzed to locate 3D connected surfaces. Two locations l and m are considered connected if:

1. l and m are adjacent image coordinates; and
2. $|R_l - R_m| < \tau$.

A set of image locations U is said to be connected if every image location in U is connected to some other image location in U. Two disjoint sets of locations $U_1$ and $U_2$ are said to be connected if there are locations $l \in U_1$ and $m \in U_2$ such that l and m are connected.

U can then be partitioned into maximal connected components $U_1, U_2, \ldots U_k$ such that each $U_i$ is connected and no $U_i$ is connected to $U_j$ if $i \ne j$. This can be performed by computing maximal connected components of an undirected graph wherein a node is created for each element of U, and a pair of nodes is connected by an edge if the corresponding locations in U are connected. Algorithms for the computing maximal connected components of an undirected graph can be found many introductory texts in computer science such as M. Goodrich and R. Tamassia, *Data Structures and Algorithms in Java,* Wiley, 2005.

Detect and Cluster forms the list $D_i$ of data values at the locations contained in each $U_i$. Detect and Cluster returns the list $D_1, D_2, \ldots D_k$.

Model Classification

The object models employed by the first embodiment are spheres, cylinders, and cuboids. The first embodiment uses a set of robust fitting functions to model and classify data into these object models. The fitting process consists of several cases as described below. Each makes use of error terms computed by a data modeling function. The data modeling functions take the form of a signed "inside-outside" function, V, which has the same properties as the signed distance function referenced earlier, but is not required to compute a Euclidean distance from a point to the surface of an object instance.

Model Fitting for Spheres, Unconstrained Optimization

To illustrate the method used by the first embodiment, consider the specific case of a sphere centered at a point $c=(c_x; c_y; c_z)^T$ with radius r. Let μ represent these parameters. Given a point $t=(x; y; z)^T$ the signed inside-outside function is:

$$V_S(\mu;t) = V_S(c,r;t) = (x-c_x)^2 + (y-c_y)^2 + (z-c_z)^2 - r^2 \quad (8)$$

Let $\{t_i\}$ be a data cluster. A sphere is fit by optimizing the following objective function $$O(\mu) = \Sigma_i \Phi(V_S(\mu;t_i)) \quad (9)$$

where the sum is taken over the indices of $\{t_i\}$ and where Φ is defined as $$\Phi(x) = \exp(-x^2/(2\gamma^2)) \quad (10)$$

This definition depends on the parameter γ, the computation of which is described below.

The objective function O is optimized in two steps. First, the gradient of O is computed. The gradient will be zero at the optimum.

Second, a portion of the equation is linearized using a Taylor series expansion.

Both of these steps are commonly covered in texts on introductory vector calculus such as J. Marsden and A. Tromba, *Vector Calculus,* W. H. Freeman, 2003.

Taking the gradient of O with respect to μ yields $$\nabla O(\mu) = \sum_i \nabla \Phi(V_S(\mu; t_i)) \quad (11)$$

-continued $$= \sum_i \nabla \exp(-V_S(\mu; t_i)^2/(2\gamma^2))$$

$$= -\sum_i \nabla (V_S(\mu; t_i)^2) \exp(-V_S(\mu; t_i)^2/(2\gamma^2))/(2\gamma^2)$$

Let $\mu^*$ be an estimate for $\mu$, $J_i = \nabla V_S(\mu^*; t_i)$, and $w_i = \Phi(V_S(\mu^*; t_i))$. Substituting the Taylor series expansion of $V_S$ and the value $w_i$ into equation (11) and setting the result equal to zero yields:

$$\nabla O(\mu) = -\sum_i w_i \nabla (V_S(\mu^*; t_i) + J_i(\mu - \mu^*))^2/(2\gamma^2) \quad (12)$$

$$= -2\sum_i w_i (J_i^T(V_S(\mu^*; t_i) + J_i(\mu - \mu^*)))/(2\gamma^2)$$

$$= 0$$

This is a linear system that can be solved to provide an updated solution for $\mu$. Methods for solving linear systems are described in introductory textbooks on matrix algebra such as G. Golub and C. Van Loan, *Matrix Computations*, The Johns Hopkins University Press, 1996. The updated solution for $\mu$ is used to compute new values for $J_i$ and $w_i$ and the process repeated.

The value of $\gamma$ is also estimated at each iteration, as follows: For a parameter value $\mu$ and data point $t_i$, $V_S(\mu, t_i)$ yields a value. The median, m, of these values for all range points in the data cluster is computed, and $\gamma = \max(\sigma, 1.48 \text{ m})$ where $\sigma$ is the data error model described previously.

These algorithms are iterated until the change in $\mu$ is smaller than a threshold. If this does not occur within a fixed number of iterations, the fitting algorithm is considered to have failed. The first embodiment uses a threshold of $10^{-5}$ and fixes the maximum number of iterations at 50.

A starting estimate for the radius of the sphere is taken as ½ of the largest dimension of a robust 3D bounding box for the data cluster. The starting estimate for the center of the sphere is taken to be the center of the robust 3D bounding box.

A robust 3D bounding box is described by a minimum and maximum value in each of the 3 dimensions. The values for each dimension of a robust bounding box are computed by sorting the data values for that dimension, discarding a percentage of the largest and smallest values, and taking the minimum and maximum of the remainder. The percentage discarded in the first embodiment is 1%.

Model Fitting for Cuboids

Cuboids are modeled by taking advantage of the fact that at most three surfaces will be visible in any range image. The first step in estimation is to compute a rotation R and position c that places a vertex common to all visible surfaces at the origin and orients the sides with the coordinate axes. In this position, one of the components of the transformed data will be zero except for sensor error. Hence, the objective function is:

$$O(R,c) = \Sigma_i \Phi(\min(|r_{ix}|, |r_{iy}|, |r_{iz}|)) \quad (13)$$

where $r_{ix}$, $r_{iy}$, $r_{iz}$ is the x-, y- and z-component respectively of $r_i = R^T(t_i - c)$.

The fitting procedure operates as follows. First, a prior estimate $R^-$ and $c^-$ is applied to the data, producing transformed data $t_i^- = (R^-)^T(t_i - c^-)$. Second, a small-angle approximation of R is applied as $R' = (I + sk(x))$ where sk creates a skew symmetric matrix from the vector x. Skew symmetric matrices are discussed in many texts on introductory linear algebra such as Gilbert Strang, *Linear Algebra and its Applications*, Academic Press, Inc, 2005. With this $r_i = (I + sk(x))^T(t_i^- - \Delta c)$. Finally, let m(i) be the component of $t_i^-$ with minimum absolute value. The new objective function is $$O(x, \Delta c) = \Sigma_i \Phi(r_{i,m(i)}) \quad (14)$$

With these approximations, the argument of $\Phi$ is linear in x and $\Delta c$, and the methods described above are used to solve for their values. After solving for x and $\Delta c$, the new rotation is $R^+ = R^-(I + sk(x))$ and the new location is $c^+ = c^- + R^- \Delta c$.

After the optimal R and c are computed, a robust 3D bounding box for the transformed data is computed. The size of the bounding box is taken as the size of the object instance. The center of the object instance is the optimal value of c offset to the center of the 3D bounding box.

In the first embodiment, the starting orientation for a cuboid is given by a single rotation angle about the gravity vector. The rotation angle is computed by first projecting the 3D data points in the data cluster onto a 2D ground plane, and then performing a RANSAC procedure on the projected points to robustly fit a line on the ground plane to the projected data. The RANSAC method for line finding is discussed in many texts on computer vision such as E. Trucco and A. Verri, supra. The line is taken as the orientation of one of the sides of the cuboid. After applying this initial rotation to the data, a robust 3D bounding box is fit, and the vertex of the robust 3D bounding box closest to the range sensor prior to the rotation is taken as the vertex common to all visible surfaces about which the computations described above take place.

Model Fitting for Cylinders

The position of a cylinder is the center. Its orientation is given by a unit vector, a, along the central axis of the cylinder. A cylinder has a radius r and height h.

A cylinder is fit by first fitting the curved side, then computing the height along the central axis. The inside-outside function for the side of a cylinder is $$V_C(a, c, r; t) = \|(t-c) \otimes a\|^2 - r^2 = 0 \quad (15)$$

where $\otimes$ denotes the cross product operation on two 3D vectors.

The fitting methods described for the sphere case are applied to this function with three modifications. First, the unit vector constraint on a is enforced as follows. If $a^-$ is the current estimate for a, and $\Delta a$ is the change to be computed, then the constraint $a^- \cdot \Delta a = 0$ is added to the linear system formed in equation (12). Second, the value of c along a is not determined by (15). This is remedied by constraining c to lie near the centroid of all points projected onto the axis a. Let $A = a^- a^{-T}$, let $t_{avg}$ be the average of all data points t, and let $\Delta c$ be the change in c to be computed. The equation $A t_{avg} = A(c + \Delta c)$ is added to the linear system. Third, after each iteration, the new estimate for a is renormalized to be a unit vector.

The height of the cylinder and the location of the center of the cylinder in the direction of a are both independent of equation (15) above. These are estimated by first computing an interval I by sorting all values $a \cdot (t - c)$ and excluding a percentage of the largest and smallest values. In the first embodiment, 1% is excluded. The height of the cylinder is set to the length of I, and the location of the center of the cylinder along a is set to be the center of I.

A cylinder is fit in two cases: upright cylinders and prone cylinders.

The initial values for an upright cylinder are computed by projecting the data cluster to a ground plane. A robust 2D bounding box is fit. The initial radius is ½ the maximal dimension of the bounding box, and the initial center is the center of the bounding box. The initial central axis points along the normal to the ground plane.

The initial values for a prone cylinder are computed by projecting the data onto a ground plane. A RANSAC procedure is applied to robustly fit a line to the data. A robust 2D bounding box oriented with this line is computed. Two cases are tested: one fit taking the initial axis of the cylinder along the line, and one with the initial axis perpendicular to the line. The initial radii are taken as ½ the size of the bounding box in the direction perpendicular to the chosen axis. The fitting result with the largest number of range points within the distance $\tau$ of the model surface is returned as the result.

Support Constraints when Fitting

All object instances are required to have one or more object instances as support. All possible supporting objects are required to have a horizontal planar upper surface. This includes upright cylinders and cuboids. If there are multiple supporting objects, their upper surfaces must be at the same height.

Support is included into the fitting process by constraining the bottom of the model to be fit to be in contact with its support planes. For a sphere or prone cylinder, this is accomplished by setting the radius of the sphere or prone cylinder to its height above the support plane during fitting. For upright cylinders, the center of the cylinder along its central axis is set to be ½ the height of the cylinder above the support plane. Likewise, for cuboids, the location of the center in the gravity direction is adjusted to be ½ the size of the cuboid in the direction above the support plane.

The Compute New Objects Function

A range surface is classified through fitting. Each data cluster is a set of 3D points. This set of 3D points is modeled as a single object. Given a set of 3D points and the height of a supporting plane, all of the available model fitting algorithms are applied to the data with the bottom of the model constrained to be on the support plane. In each case, a goodness of fit is computed as the number n of range points in the data cluster of 3D points within a distance $\tau$ of the fit model. The model and model parameters that maximize this value are chosen as the result of classification.

If the number of range points fitting the model does not pass the Object Presence test, where N is taken as the number of points in the data cluster and n is the goodness of fit computed during classification, then the classification is considered to have failed.

The Support for Data Cluster Function

The Support for Data Cluster function operates as follows. The data from a data cluster is projected onto a ground plane and a bounding box is computed. Any object that, when projected to this ground plane, intersects this bounding box is a candidate support object instance. This set of objects is pruned to remove objects that do not have a planar upper surface and to remove objects that have an upper surface that is higher than any point in the data cluster. The remaining object instances are returned as possible support object instances.

Model with Support

The Model with Support function calls the Support for Data Cluster Function to get a list of potential supports.

The heights of the planar upper surfaces of all members of the list of potential supports are computed. This produces a list of computed support heights. The Compute New Objects function is called with the data cluster and each computed support height in the list of computed support heights. If Compute New Objects fails on all of the support heights in the list of computed support heights, then Model with Support fails.

If Compute New Objects succeeds on one or more support heights, the goodness of fit of all of the corresponding data models is compared and the data model with the best goodness of fit is returned.

Adjust Existing Object

In the first embodiment, the Adjust Existing Object function is the same as the Compute New Objects function, with four changes: 1) the shape of the object (Sphere, Cylinder, or Cuboid) is held fixed; 2) the size of the object instance is held fixed and the fitting is only applied to the pose parameters, 3) the fitting is initialized at the prior pose, and 4) the fitting takes place on the data associated with the object instance. The support height for Adjust Existing Object is taken to be the height of the upper surfaces of the supporting objects recorded in the current 3D scene model for this object instance. Adjust Existing Object fails under the same conditions as the Compute New Objects function.

Identify Objects

In the first embodiment, two objects pass this test if they are of the same type (Sphere, Cylinder, or Cuboid) and the dimensions agree to within the data tolerance $\tau$.

Geometry Functions

The SY Algorithm also makes use of several geometric functions that do not depend on the type of sensor data:

Collision Check. Given a distinguished object, p, and 3D scene model, this function checks for collision of p with any Substantial object.

Adjust for Adjacent. This function takes a distinguished object, p, a 3D scene model, and a shift tolerance. It computes a pose adjustment to place p in contact with at least one Substantial support object below it and out of collision with all Substantial objects, provided that such a displacement can be found within the specified shift tolerance. Specifically, it first computes a vertical displacement to place p in contact with support(s) below it. Then, assuming that the vertical displacement was made, it computes the horizontal displacement to avoid collisions. This will fail if there is no such displacement within the specified tolerance. It can also fail if p is surrounded by Substantial objects on opposite sides so motion in either direction does not resolve the collision conflict.

The Supports function. Given a distinguished object, p, and 3D scene model, this function returns the object(s) that support p.

Alternative Embodiments and Implementations

The invention has been described above with reference to certain embodiments and implementations. Various alternative embodiments and implementations are set forth below. It will be recognized that the following discussion is intended as illustrative rather than limiting.

There are many alternative embodiments of the present invention. Which is preferable in a given situation may depend upon several factors, including the application. Various applications use various image types, require recognizing various types of objects in a scene, have varied requirements for computational speed, and varied constraints on the affordability of computing devices. These and other considerations dictate choice among alternatives.

Data Association

In FIG. 1, referring to step 105, image data is compared with objects of the 3D scene model. Let p be an object in a 3D scene model G. Let $R_I^{obs}$ be an observed range image and $\Gamma$ be an observer descriptor. The first embodiment computes the data associated with p using the signed distance function for p. Alternative embodiments may compute the data associated with p in other ways. For example, it may be computed using a synthetic range map $R_l^{rend}(G, \Gamma, p)$, as $$A_p = \{l \in L_p : |R_l^{obs} - R_l^{rend}(G,\Gamma,p)| \leq \tau \wedge \forall q |R_l^{obs} - R_l^{rend}(G,\Gamma,q)| \geq |R_l^{obs} - R_l^{rend}(G,\Gamma,p)|\} \quad (16)$$

The value of $\tau$ is sensor dependent and is determined in the same manner as in the first embodiment.

Other embodiments may employ other methods to perform association. One method is to compute a quality measure of associating the data point to the model, and accept data points that exceed the quality measure. One such quality measure is the data likelihood conditioned on the presence of the object. Another quality measure is the likelihood ratio which is the likelihood of the data given the presence object versus the likelihood of the data given the object is absent.

Other embodiments may allow multiple associations, and create and maintain multiple alternative 3D scene models that are disambiguated at a later stage in the processing.

Object Presence Test

In the first embodiment, the Object Presence Test function for on object p operates by comparing n, the number of image locations associated with p, with N, the number of image locations of p that are visible in the synthetic rendered 3D scene model. In alternative embodiments, the integer n is modeled as a binomal random variable of N observations, each true with probability $\alpha \geq \text{erf}(\tau/(\sigma \sqrt{2})) - \beta$. The distribution on n is approximated using a normal distribution with mean $\mu = \alpha N$ and $\sigma = \sqrt{N\alpha(1-\alpha)}$. This method of approximation is commonly used and is explained in standard texts such as A. Papoulis and S. Pillai, *Probability, Random Variables, and Stochastic Processes*, McGraw Hill, 2002." This text also contains tables tabulating the necessary values of the erf function.

In such alternative embodiments, the Object Presence test succeeds if $$n > \alpha N - 5\sqrt{N\alpha(1-\alpha)} \text{ with } \alpha = \text{erf}(\tau/(\sigma \sqrt{2})) - \beta. \quad (17)$$

Model with Support

In the first embodiment, the Model With Support function operates as described. In alternative embodiments, more general support relationships may be admitted. For example, an object may be supported where the contact points are at varying heights.

Other embodiments may make use of additional physical constraints and compliance. Some embodiments may model gravity and ensure that object support relationships are consistent with gravity. Other embodiments may use other physical properties such as surface friction to compute support relationships. Other embodiments may maintain information about the material properties of objects and allow objects to deform under contact forces.

Adjust Existing Object

In the first embodiment, the Adjust Existing Object function operates as described. In alternative embodiments, more general techniques may be used. For example, rather than compute only a pose change, the size of an object may be adjusted based on the new data. Additionally, more general support relationships may be admitted: an object may be supported where the contact points are at varying heights. Also, additional physical constraints may be imposed and compliance may be allowed.

Adjust for Adjacent

In the first embodiment, the Adjust for Adjacent function operates as described. In alternative embodiments, more general techniques may be used. For example, rather than compute only a displacement, a general pose change may be computed. Additionally, the object's size as well as pose may be changed, within limits, to avoid collision; this size adjustment may required if a new object is placed tightly between two existing objects.

In the first embodiment, the Compute New Objects function is called and subsequently the Adjust for Adjacent function is called. In alternative embodiments, object modeling and adjustment for adjacent objects may be performed jointly. That is, object adjacency may be taken as a hard constraint during the optimization process used by the Compute New Objects function.

In still other embodiments, physical as well as geometric constraints may be considered in computing the pose of an object so it is correctly placed on its supports. The center of mass of each object may be obtained either by assuming uniform density or from data in an object library. The pose of the object is then computed so that the object's center of mass is inside the support polygon.

Identify Objects

In the first embodiment, two objects $p_1$ and $p_2$ may be identified with each other if they are of the same type (Sphere, Cylinder, or Cuboid) and the dimensions agree to within the data tolerance value $\tau$. In other embodiments, tests may include proximity, i.e. the distance of $p_2$ from the prior location of $p_1$ and/or the presence of obstacles on the path from the prior location to the location of $p_2$. In still other embodiments, tests may additionally consider physical properties of objects, e.g. spheres roll readily, or priors on mobility, e.g. people move while walls typically do not. The likelihood of identity may be returned and the calling function may use the likelihood when there are multiple possible identifications.

Superquadrics

The first embodiment allows objects in a 3D scene model to be spheres, cylinders, or cuboids. In alternative embodiments, additional classes of object shapes may be included. Many classes of object shapes have been studied and techniques published for recognizing instances for these shapes.

One class of object shapes is superquadrics. The book Alex Leonardis, Ales Jaklic, and Franc Solina. *Segmentation and Recovery of Superquadrics*, Kluwer Academic Publishers, Boston, Mass., 2000 describes how superquadrics can be identified in an image. These techniques are employed to compute the pose and model parameters of a superquadric in a 3D scene model and thus to implement the Compute New Objects function.

As in the first embodiment, Data Association is performed to find the associated and unassociated data. Detect and Cluster is called on the unassociated data to form data clusters. Each data cluster is given as input to Compute New Objects which, in these alternative embodiments, model each cluster as one or more superquadrics.

Range Model Objects

In still other alternative embodiments, there is a library of object models and object instances in the scene may be of arbitrary shape, provided that each object instance in the scene is present in the library. The models in the library are based on range images.

The operation of this alternative embodiment is similar to that of the first embodiment. The primary difference is the Compute New Objects function, which matches range image data to object models in the library and computes their pose in the scene. This is referred to in the literature as "object recognition in range data".

There is a considerable literature in this field. Campbell and Flynn, supra is a recent survey; see especially Section 5.3, "Free-Form Object Recognition in Range Data". More recent work in object recognition with 3D range models is described in A. Johnson and M. Hebert, "Efficient multiple model recognition in cluttered 3-D scenes", *Proc. Computer Vision and Pattern Recognition* (CVPR '98), pp. 671-678, 1998.

These techniques are employed to implement the data-dependent functions used by the SY Algorithm and, in particular, the Compute New Objects function. A common problem in the prior work is clutter and occlusion. In the context of the SY Algorithm, these problems are considerably ameliorated. Compute New Objects is called with a cluster of isolated image data that is not associated with identified objects in the scene, thereby reducing the effects of clutter. Additionally, when objects are added in the foreground, as is often the case, the effect of occlusion is ameliorated, because a scene object may be recognized when it is fully visible and its identity retained in later 3D scene models when it is occluded.

It is possible that a cluster of image data cannot be recognized as matching any of the objects in the library. In alternative embodiments, it is possible to deal with this situation as follows. Any cluster of image data that cannot be matched is first modeled as a set of polygons; this describes the front surface, the side of the object facing the image sensor. The minimal surface of the object is computed by modeling the object as a thin shell, where the back side has the same shape as the front side. The maximal volume of the object is computed by sweeping back the front surface until other objects in the 3D scene model are encountered; from the maximal volume, the maximal surface is constructed as a set of polygons. The object is represented as a pair<minimal surface, maximal surface>.

Intensity Images with a Library of Object Models

In the first embodiment, the image is range data and the objects in the scene belong to one of three shape classes. In alternative embodiments, the image is intensity data and there is a library of object models. The object models in the library consist of a geometric model and associated appearance information. The geometric models and associated appearance information may take many forms, including the sensed geometry and appearance of the object during a prior model learning stage. Objects in the scene may be of arbitrary shape, provided that each object in the scene is present in the library. The models in the library are recognized based on intensity images. This is sometimes referred to in the literature as "appearance-based object recognition."

For example, the intensity image may be a color image as may be obtained from a color camera. This is commercially significant because there is a wide range of color cameras, some of which are small, lightweight, and inexpensive. Constructing a 3D scene model from a color image has many important applications, some of which are described below.

In these alternative embodiments, the data dependent functions used by the SY Algorithm are defined as follows:

The Sufficiently Visible function is the same as in the first embodiment.

The Data Association function: Referring to step 105 in FIG. 1, let p be an object in the 3D scene model. Let $I^{rend}(G, \Gamma, p)$ the result of a synthetic rendering of p in G from observer $\Gamma$. As noted earlier, rendering three-dimensional geometric objects with attached texture or appearance information from a given viewpoint is a well-understood operation in computer graphics.

Let $I^{obs}$ be the sensed image. Both $I^{obs}$ and $I^{rend}(G, \Gamma, p)$ may be processed with a low-pass filter designed to reduce sensitivity to small changes in pose and a color normalization to correct for changes in local or global pixel intensity, resulting in $F^{obs}$ and $F^{rend}(G, \Gamma, p)$ respectively. Let L be the set of image locations. The data associated with p may be computed as $$A_p = \{l \in L_p : \|F_l^{obs} - F_l^{rend}(G,\Gamma,p)\| \leq \tau \wedge \forall q \|F_l^{obs} - F_l^{rend}(G,\Gamma,q)\| \geq \|F_l^{obs} - F_l^{rend}(G,\Gamma,p)\|\} \quad (18)$$

Other embodiments may make use of other distance measures that are insensitive to small changes in object pose. Examples include the shuffle distance, the chamfer distance, and the Bhattacharyya histogram distance.

The Object Presence Test function: Referring to step 203 of FIG. 2, this is the same as in the first embodiment, except that $A_p$ is computed as immediately above.

The Detect and Cluster function is the same as in the first embodiment, except that clustering is carried out using only the 2D image locations of the unassociated data. This may under-segment the data, so that a data cluster may correspond to more than one object instance; this under segmentation is discussed below.

The Compute New Objects function, referred to at step 108 in FIG. 1, matches clusters of unassociated image data to models in the library of object models. Specifically, it (1) chooses the best-matching model from the library and (2) computes a pose for the object instance placed in the 3D scene model that best conforms to the observed image data. There is an extensive literature of techniques for so doing. Campbell and Flynn, supra is a survey; see especially Section 5.1, "Appearance-Based Recognition". Any of these techniques may be used to implement the Compute New Objects function in various alternative embodiments. In the context of the present invention, these techniques gain a computational advantage in that the data to be considered in each match is a cluster of unassociated data, which is typically far less than the entire image, thereby reducing searches and other combinatorial steps.

Support for Data Cluster function: When the image is an intensity image, the possible supports cannot always be reliably determined from unassociated data. Hence, this function is a null operation.

Model with Support function: This function calls Compute New Objects, passing it a cluster of unassociated data.

The Adjust Existing Object function is similar to Compute New Objects, with the following differences: (1) the choice of object in the library of object models is fixed and only the pose of the object instance in the 3D scene model is modified, (2) the prior pose is used to initialize the process of finding the new pose, and (3) the fitting takes place on the data associated with the object instance.

The Identify Objects test: Two object instances pass this test if they are both instances of the same object in the library of object models.

Image Features in Intensity Images

Several of the techniques used for appearance-based object recognition use image features. In broad outline, these techniques find distinctive points in an image (sometimes referred to as "interest points" or "keypoints"), extract features at these distinctive points, and use these features to match against a library of features in a database. As each object in the library has a collection of features, feature matching can be used to achieve object matching.

This class of techniques is described in many technical papers. One is David G. Lowe, "Distinctive image features from scale-invariant keypoints", *International Journal of Computer Vision*, Vol. 60, No. 2, pp. 91-110, 2004. Another is Mikolajczyk, K. Schmid, C, "A Performance Evaluation of Local Descriptors", *IEEE Transactions on Pattern Analy-*

*sis and Machine Intelligence,* Vol. 27; No. 10, pages 1615-1630, 2005. Another is F. Rothganger and Svetlana Lazebnik and Cordelia Schmid and Jean Ponce, "Object modeling and recognition using local affine-invariant image descriptors and multi-view spatial constraints", *International Journal of Computer Vision,* Vol. 66, No. 3, 2006. Additionally, novel techniques are described in U.S. patent application Ser. No. 11/452,815 by the present inventors, which is incorporated herein by reference.

When the matching technique is based on features, there are alternative embodiments that use the features rather than the image pixel values in some of the data-dependent functions. The primary differences are as follows:

The Sufficiently Visible function: The Sufficiently Visible function is computed for an object instance p in a 3D scene model G from observer Γ as follows. The 3D scene model G is processed to detect the features that would be visible from the relevant observer Γ description. Specifically, if p is an object instance in G, let $\{f_p^{rend}\}$ be those features of p that are visible in G from observer Γ. Let n be the size of $\{f_p^{rend}\}$. If n is greater than a threshold, p is deemed to have adequate data, otherwise it does not.

The Data Association function: Refer to operation 105 in FIG. 1. The observed image is processed to detect image features; call these $\{f^{obs}\}$. The 3D scene model G is processed to detect the features that would be visible from the relevant observer Γ description. Specifically, if p is an object instance in G, let $\{f_p^{rend}\}$ be those features of p that are visible in G from observer Γ. The data associated with p are those features of $\{f^{obs}\}$ that match features of $\{f_p^{rend}\}$ in the same or nearby image locations. The unassociated data are those features of $\{f^{obs}\}$ that cannot be so matched.

The Object Presence Test function is based on feature matches. For example, let p be an object in the 3D scene model and let $\{f_p^{match}\}$ be the subset of $\{f_p^{rend}\}$ that match features of $\{f^{obs}\}$. The Object Presence test may consider the ratio of $|\{f_p^{match}\}|$ to $|\{f_p^{rend}\}|$. In other alternative embodiments the quality of the matches may be used as well.

The Detect and Cluster function detects all the features that are not associated and places them into a single cluster.

The Compute New Objects function: Referring to step 108 in FIG. 1, this function matches clusters of unmatched features from the set $\{f^{obs}\}$ to features in models in the library of object model. From the matched features, it chooses the best-matching model from the library and computes the pose for the object instance placed in the 3D scene model that best conforms to the observed image data.

The Adjust Existing Object function is based on matching features associated with an object and adjusting the pose of the object so that the locations of rendered features are consistent with the observed features to which they are matched.

Intensity Images with a Library of Class Models

In the first embodiment, the image is range data and the objects in the scene belong to one of three classes. In alternative embodiments, the image is intensity data and there is a library of class models. Object instances in the scene may be of arbitrary shape, provided that each object in the scene is an instance of a class in the library. Each class model in the library describes a class of related objects, e.g. chairs, trucks, cars, barns, etc. Depending on the application, classes may be hierarchical, e.g., the class of trucks might consist of sub-classes for dump trucks, tow trucks, pickup trucks, etc.

The classes in the library are based on intensity images. Typically each class is obtained by a statistical learning process from multiple instances of that class. The class model generalizes over the class instances, abstracting what is common among the instances.

The operation of this alternative embodiment is similar to that of "Intensity Images with a Library of Object Models", immediately above. The primary difference is the Compute New Objects function, step 108 of FIG. 1. When the library consists of class models, Compute New Objects performs three activities. It (1) chooses the best-matching model from the library, (2) computes a pose for the object instance placed in the 3D scene model that best conforms to the observed image data, and (3) computes class-specific parameters, θ, that describe how the object instance is derived from the class model. For example, a class model might be expandable, in which case the class parameter specifies the size; or a class model might be stretchable in each dimension, in which case the class parameters specify the stretch in each direction.

There are many techniques for matching image data to models in a library of class models. For example, various techniques are described in the following papers: (1) Dorko and Schmid, "Selection of Scale-Invariant Parts for Object Class Recognition", *International Conference on Computer Vision,* (ICCV2003), pp. 634-640, 2003; (2) Burl et al., "A probabilistic approach to object recognition using local photometry and global geometry" *Proc. European Conference on Computer Vision (ECCV)* 1998, pp 628-641; (3) Fergus et al., "Object Class Recognition by Unsupervised Scale-Invariant Learning", *Computer Vision and Pattern Recognition,* pp 264-271, 2003; (4) Helmer and Lowe, "Object Class Recognition with Many Local Features", *IEEE Computer Vision and Pattern Recognition Workshops,* 2004 (CVPRW'04), pp. 187 ff. Additionally, novel techniques for matching image data to models in a library of 3D class models are described in U.S. patent application Ser. No. 11/452,815 by the present inventors, which is incorporated herein by reference. Any of these techniques may be used to match image data to models in a library of class models.

When such a library of class models is used in an alternative embodiment, the library is constructed to have a parameterized shape model for each class in the library. Given a match between unassociated image data and a class model, C, the pose is computed and, in addition, a set of class parameters, θ, such that C(θ) specifies the 3D shape of an object instance.

The Adjust Existing Object function is similar to Compute New Objects, with the following differences: (1) the choice of object in the library of object models is fixed; only the pose and class parameters of the object instance in the 3D scene model are modified, (2) the prior pose and class parameters are used to initialize the process of finding the new pose and class parameters, and (3) the fitting takes place on the data associated with the object instance.

Range Plus Intensity Images

In the first embodiment, the image is range data and the objects in the scene belong to one of three classes. In other embodiments, the image may be range data plus intensity data and the objects in the scene may be either objects in a library of object models or objects in a library of class models.

The operation of this alternative embodiment is similar to that of the first embodiment. The primary difference is the Compute New Objects function: In this alternative embodiment, Compute New Objects matches clusters of unassociated data to models in the library, either object models or class models, using both range and intensity information. Techniques for so doing are described in U.S. patent application Ser. No. 11/159,660 by the present inventors, which are incorporated herein by reference.

Identifying Multiple Objects in a Data Cluster

Referring to step 108 of FIG. 1, Compute New Objects, in the first embodiment each data cluster of unassociated data is modeled as a single object. In other embodiments, a data cluster may correspond to more than one object. In this case, Compute New Objects must identify the several objects in the data cluster.

Many of the various techniques for implementing the Compute New Objects function described in the above alternative embodiments are able to identify multiple objects in a data cluster. However, their computation time usually grows as a function of the number of objects they identify and the growth is typically more than linear. In context of the present invention, these techniques gain a computational advantage in that the data to be considered in each match is a cluster of unassociated data, which is typically far less than the entire image, thereby reducing searches and other combinatorial steps.

Multiple Observers

The invention has been described above in the context of a single sensor system with a single observer $\Gamma$. However, the present invention may make use of multiple sensor systems, each with an observer, so that in general there is a set of observers $\{\Gamma_i\}$. In this case, the Sufficiently Visible function considers the Sufficiently Visible function for each of the observers $\Gamma_i$; the test succeeds if the object is Sufficiently Visible from any of the $\Gamma_i$. The Object Presence Test succeeds if the Object Presence Test succeeds for all observers for which Sufficiently Visible succeeds. The Data Association, Detect and Cluster, Compute New Objects, Support for Data Cluster and Model with Support functions use data from all the sensors.

Moving Observers

The present invention may make use of one or more sensor systems that move over time, so that in general there is a time-varying set of observer descriptions $\{\Gamma_i\}$. In this case, the position of an observer may be provided by external sensors such as joint encoders, odometry or GPS. Alternatively, the pose of an observer may be computed from the images themselves by comparing with prior images or the prior scene model. Alternatively, the position of an observer may be computed by some combination thereof.

Moving Objects

In the first embodiment, the dynamic model is that objects typically do not move. In alternative embodiments, the dynamic model may provide for one or more objects that are known to move, e.g. with constant velocity, or with constant acceleration, possibly along a constrained path, possible in relation to other objects. In such alternative embodiments, the prior 3D scene model may be updated according to the dynamic model before it is used to initialize the computed 3D scene model.

Dividing the Scene into Regions

In the first embodiment, search is carried out by the SY Algorithm. In alternative embodiments, alternative search techniques may be used. In particular, the structure of the scene may be used to optimize the computation in the search process.

One optimization is to separate the scene into disjoint regions and operate on each region separately or in parallel. Operating on each region separately reduces the combinatorial complexity associated with the number of objects. Additionally, operating on each region in parallel allows the effective use of multiple processors. As an example of when this separation may be carried out, suppose there is a ground plane subtending the field of view. Suppose that objects in the 3D scene model may be partitioned into regions so that when the 3D scene model is rendered, the rendered images of the regions are separated by the ground plane and that the sensed image may be partitioned in the same way. Then the regions do not interact and each region may be processed independently.

Using the Occlusion Ordering

Another way of organizing the search is to use the ordering induced by occlusion where the ordering is unambiguous. Where the ordering is unambiguous, processing is carried out in foreground to background order.

As an example, consider the case where the image is range data. Let G be a 3D scene model, $I^{obs}$ be an observed image and $\Gamma$ be the observer description. Suppose there is an object p in G that is occluded by no other object. Let $L_p$ be the set of locations where p is visible from observer description $\Gamma$. Suppose that for all locations $l \in L_p$, $I_l^{obs}$ is associated with object p in the sense described in the first embodiment. Then p is taken to be present in the Same Pose and excluded from consideration in subsequent processing; additionally, the image locations $l \in L_p$ can be excluded from subsequent processing. The process can continue if there are other objects q in G that are occluded only by objects previously excluded from further processing.

Previously unobserved objects are included in this modification by first performing step 601 of the first embodiment. The Data Clusters that result can be modeled as triangulated surfaces and temporarily inserted into the current 3D scene model. As each object instance is processed from front to back, these temporary object instances will be encountered. Each time they are, the Compute New Objects function is called to create an object instance for the data.

Objects with a perturbed pose are included by testing each absent object, as it is encountered in the front to back ordering, to determine if it is connected to unassociated data clusters. If so, Compute New Objects is called as is described in the first embodiment.

Optimizing Over Multiple Alternatives

The SY Algorithm makes a fixed set of decisions during its processing, leading to a single final 3D scene model. Alternative embodiments may use a search algorithm that explores multiple alternatives and returns the best 3D scene model by choosing among those alternatives.

For example, the SY Algorithm chooses a single object model for each data cluster in step 604. However, alternative search algorithms may compute multiple possible object models for a cluster of unassociated data and then consider multiple 3D scene models, each containing one of the possible object models. Each resulting 3D scene model would be processed to the end, and evaluated to determine the most likely model.

The SY Algorithm chooses a specific data cluster for each Not Verified object in step 603 of the algorithm. Alternative embodiments might attempt modeling a Not Verified object from several distinct data clusters. Each resulting 3D scene model would be processed to the end, and evaluated to determine the most likely model.

The evaluation of multiple 3D scene models may include the quality of the model for explaining the data, and the probability of the changes necessary to create the 3D scene model from the prior 3D scene model. For example, it may make use of the Probabilistic Formulation described in greater detail below.

Alternative search algorithms may maintain multiple 3D scene models, and may prune the set of models dynamically using estimates the likelihood of the model or other measures of model quality. The search may perform its computation using a tree search, in which case branch and bound methods may be applied.

Distributions on the 3D Scene Model

In the first embodiment, the 3D scene model is a collection of objects, each with a specific pose and parameters. In alternative embodiments, the 3D scene model may be a distribution. To avoid ambiguity, it is useful to refer to this kind of 3D scene model as a "3D scene distribution". If there is uncertainty about the prior 3D scene model, it is represented as a prior 3D scene distribution. If there is uncertainty about a computed 3D scene model, it is represented as a computed 3D scene distribution.

In one such alternative, each object is represented by a distribution on its pose. When object classes are considered, each object may be additionally represented by a distribution on the parameters describing class instances. These distributions represent parameter uncertainty.

In still another alternative, the 3D scene distribution is a distribution on structure. That is, each element of the distribution is itself a prior 3D scene model, each with its own distribution on objects' pose and possibly objects' parameters. These elements represent both structure and parameter uncertainty.

Suppose the prior is a 3D scene distribution. In some alternative embodiments, the distribution is sampled and the techniques described above applied to each sample. The result is a computed 3D scene distribution. Other alternative embodiments use distributions as described below.

Probabilistic Formulation

Given a prior 3D scene model, an image, and a model of scene change dynamics, the present invention computes a new 3D scene model which is consistent with the observed image and probable changes to the prior 3D scene model.

An optimal solution can be formalized in probabilistic terms as follows: Let $G^-$ be a prior 3D scene model, $I^{obs}$ be an image, and $\Gamma$ an observer description, the goal is to compute the 3D scene model $G^+$ that best explains the image. $G^+$ satisfies $$P(G^+|I^{obs},G^-,\Gamma)=\max_G P(G|I^{obs},G^-,\Gamma) \quad (19)$$

Expanding the right hand side and exploiting independence through a Markov assumption on scene evolution, the right hand side may be written as $$\max_G P(I^{obs}|G,\Gamma)P(G|G^-) \quad (20)$$

The first term is the data term, the probability of the image $I^{obs}$ given the 3D scene model and the observer $\Gamma$. The second term, the probability of G given $G^-$, describes probable changes to the scene based on a model of scene dynamics.

Computing an optimal $G^+$ involves two sub problems: (1) a discrete search of object additions and removals in G, and (2) a continuous optimization of the free parameters of the objects in G, e.g. their pose. The two problems must be solved jointly.

Depending on the structure of $P(I^{obs}|G, \Gamma)$ and $P(G|G^-)$, this problem may be quite complex. It may be necessary to use methods that compute an approximate solution.

Embodiments that optimize over multiple alternatives may use the value of $P(I^{obs}|G, \Gamma) P(G|G^-)$ to evaluate a 3D scene model G. The multiple 3D scene models may arise by sampling from a prior 3D scene distribution, or the multiple 3D scene models may arise at points during computation where the correct decision is ambiguous.

Sequential Monte Carlo Methods

One notable class of technique for computing an approximate solution using multiple alternatives is that of sequential Monte Carlo methods relying on sampling. For a text on such methods, see A. Doucet, J. F. G. de Freitas, and N. J. Gordon, editors. *Sequential Monte Carlo Methods In Practice*. Springer, 2001. A 3D scene model is computed from the image and a prior 3D scene mode as a multi-stage problem involving a sequence of incremental changes.

In one embodiment, multiple possible 3D scene models are represented by multiple particles. This may be regarded as a search in which multiple hypotheses are maintained simultaneously. In general, each particle may represent its objects as distributions. The computation is divided in epochs. In the $t^{th}$ epoch, there is a set of possible 3D scene models, denoted by $S^t = \{G^t_1 \ldots G^t_{n_t}\}$. $S^0$ is initialized to $\{G^-\}$, the set consisting of the prior 3D scene model. The set $S^t$ is calculated incrementally from $S^{t-1}$, $I^{obs}$, $P(I^{obs}|G^t, \Gamma)$, and $P(G^t|G^-)$ in two phases per epoch.

In the first phase, a temporary particle set $T^t$ is computed. For each $G^{t-1}_k$, data association is performed between $I^{obs}$ and $G^{t-1}_k$, resulting in associated and unassociated data, which is used to compute possible local changes. The possible local changes are sampled, resulting in $G^t_j$. This first sampling continues until $T^t$ reaches a sufficient size, $T^t = \{G^t_1 \ldots G^t_{n_t}\}$.

In the second phase, $T^t$ is sampled with a probability proportional to the overall likelihood of each 3D scene model $G^t_k$, i.e. with a proportional to $P(I^{obs}|G^t_k, \Gamma) P(G^t_k|G^-)$. The result of this sampling is the set $S^t$.

There are many variations on this technique, depending on how changes are sampled in the first phase of each epoch, and how resampling is performed in the second phase.

Implementation of Procedural Steps

The procedural steps of several embodiments have been described above. These steps may be implemented in a variety of programming languages, such as C++, C, Java, Fortran, or any other general-purpose programming language. These implementations may be compiled into the machine language of a particular computer or they may be interpreted. They may also be implemented in the assembly language or the machine language of a particular computer.

The method may be implemented on a computer which executes program instructions stored on a computer-readable medium.

The procedural steps may also be implemented in either a general purpose computer or on specialized programmable processors. Examples of such specialized hardware include digital signal processors (DSPs), graphics processors (GPUs), media processors, and streaming processors.

The procedural steps may also be implemented in specialized processors designed for this task. In particular, integrated circuits may be used. Examples of integrated circuit technologies that may be used include Field Programmable Gate Arrays (FPGAs), gate arrays, standard cell, and full custom.

Implementations using any of the methods described in this invention disclosure may carry out some of the procedural steps in parallel rather than serially.

Application to Robotic Manipulation

The embodiments have been described as producing a 3D object model. Such a 3D object model can be used in the context of an autonomous robotic manipulator to compute a trajectory that avoids objects when the intention is to move in free space and to compute contact points for grasping and other manipulation when that is the intention.

Other Applications

The invention has been described partially in the context of robotic manipulation. The invention is not limited to this one application, but may also be applied to other applications. It will be recognized that this list is intended as illustrative rather than limiting and the invention can be utilized for varied purposes.

One such application is robotic surgery. In this case, the goal might be scene interpretation in order to determine tool safety margins, or to display preoperative information registered to the appropriate portion of the anatomy. Object models would come from an atlas of models for organs, and recognition would make use of appearance information and fitting through deformable registration.

Another application is surveillance. The system would be provided with a catalog of expected changes, and would be used to detect deviations from what is expected. For example, such a system could be used to monitor a home, an office, or public places.

Conclusion, Ramifications, and Scope

The invention disclosed herein provides a method for constructing a 3D scene model.

The present invention also provides a system for constructing a 3D scene model, comprising one or more computers or other computational devices configured to perform the steps of the various methods. The system may also include one or more cameras for obtaining an image of the scene, and one or more memories or other means of storing data for holding the prior 3D scene model and/or the constructed 3D scene model.

The present invention also provides a computer-readable medium having embodied thereon program instructions for performing the steps of the various methods described herein.

In the foregoing specification, the present invention is described with reference to specific embodiments thereof. Those skilled in the art will recognize that the present invention is not limited thereto but may readily be implemented using steps or configurations other than those described in the embodiments above, or in conjunction with steps or systems other than the embodiments described above. Various features and aspects of the above-described present invention may be used individually or jointly. Further, the present invention can be utilized in any number of environments and applications beyond those described herein without departing from the broader spirit and scope of the specification. The specification and drawings are, accordingly, to be regarded as illustrative rather than restrictive. These and other variations upon the embodiments are intended to be covered by the present invention, which is limited only by the appended claims.

What is claimed is:

1. A method for moving a robotic manipulator in free space to avoid objects in a scene, based upon a prior 3D scene model corresponding to the scene in a prior state, the prior 3D scene model comprised of 3D object models corresponding to objects of the scene in the prior state, the method comprising the steps of:
    (a) receiving, by a processor, the current image of the scene, wherein the image of the scene is a range image;
    (b) initializing, by the processor, the 3D scene model to the prior 3D scene model, wherein each object p of the 3D scene model has a signed distance function; and
    (c) modifying the 3D scene model to be consistent with the image, by:
        (i) comparing, by the processor, data of the image with 3D object models of the 3D scene model resulting in associated data and unassociated data by, for each 3D object model p, finding locations in the image such that the value of the signed distance function of the 3D object model p applied to the location is less than or equal to a specified tolerance, and the value of the distance function for all other 3D object models q applied to the location is not less than the value of p's distance function, the data points of these locations being associated data of the 3D object model p, and the data points of any locations not associated with any 3D object model p of the 3D scene model being unassociated data;
        (ii) using, by the processor, the unassociated data to compute new 3D object models and adding the new 3D object models to the 3D scene model; and
        (iii) using, by the processor, the associated data to detect 3D object models in the prior 3D scene model that are absent and removing the absent 3D object models from the 3D scene model;
    (d) computing, by the processor, a trajectory that avoids the 3D object models of the 3D scene model;
    (e) directing, by the processor, the robotic manipulator to follow the computed trajectory in the scene; and
    (f) following, by the robotic manipulator, the trajectory directed by the processor.

2. A method for moving a robotic manipulator in free space to avoid objects in a scene, based upon a prior 3D scene model corresponding to the scene in a prior state, the prior 3D scene model comprised of 3D object models corresponding to objects of the scene in the prior state, the method comprising the steps of:
    (a) receiving, by a processor, the current image of the scene;
    (b) initializing, by the processor, the 3D scene model to the prior 3D scene model; and
    (c) modifying the 3D scene model to be consistent with the image, by:
        (i) comparing, by the processor, data of the image with 3D object models of the 3D scene model, resulting in associated data and unassociated data by:
            (A) rendering each 3D object model p of the 3D scene model, resulting in a rendered image for p; and
            (B) finding locations in the image such that a first difference between the value of the image data at a location and the value of the rendered image for 3D object model p at the location is less than or equal to a tolerance and for all other 3D object models q, a second difference between the value of the image data at the location and the value of the rendered image for 3D object model q at the location is not less than the first difference, the data points of these locations being associated data of the 3D object model p, and the data points of any locations not associated with any 3D object model of the 3D scene model being unassociated data;
        (ii) using, by the processor, the unassociated data to compute new 3D object models and adding the new 3D object models to the 3D scene model; and
        (iii) using, by the processor, the associated data to detect 3D object models in the prior 3D scene model that are absent and removing the absent 3D object models from the 3D scene model;
    (d) computing, by the processor, a trajectory that avoids the 3D object models of the 3D scene model;

(e) directing, by the processor, the robotic manipulator to follow the computed trajectory in the scene; and
(f) following, by the robotic manipulator, the trajectory directed by the processor.

3. A method for moving a robotic manipulator in free space to avoid objects in a scene, based upon a prior 3D scene model corresponding to the scene in a prior state, the prior 3D scene model comprised of 3D object models corresponding to objects of the scene in the prior state, the method comprising the steps of:
(a) receiving, by a processor, the current image of the scene;
(b) initializing, by the processor, the 3D scene model to the prior 3D scene model; and
(c) modifying the 3D scene model to be consistent with the image, by:
(i) comparing, by the processor, data of the image with 3D object models of the 3D scene model, resulting in associated data and unassociated data;
(ii) using, by the processor, the unassociated data to compute new 3D object models and adding the new 3D object models to the 3D scene model; and
(iii) using, by the processor, the associated data to detect 3D object models in the prior 3D scene model that are absent by:
(A) rendering the 3D scene model, resulting in a synthetic rendering;
(B) using the synthetic rendering to compute synthetic data associated with 3D object models;
(C) comparing the associated data with the synthetic data associated with objects to find 3D object models in the 3D scene model that do not appear in the image; and
(D) determining that a given 3D object model q in the 3D scene model that does not appear in the image is absent from the scene by finding that there is no set of other 3D object models that may be computed from the image that occludes the 3D object model q;
and removing the absent 3D object models from the 3D scene model;
(d) computing, by the processor, a trajectory that avoids the 3D object models of the 3D scene model;
(e) directing, by the processor, the robotic manipulator to follow the computed trajectory in the scene; and
(f) following, by the robotic manipulator, the trajectory directed by the processor.

4. A method for moving a robotic manipulator in free space to avoid objects in a scene, based upon a prior 3D scene model corresponding to the scene in a prior state, the prior 3D scene model comprised of 3D object models corresponding to objects of the scene in the prior state, the method comprising the steps of:
(a) receiving, by a processor, the current image of the scene;
(b) initializing, by the processor, the 3D scene model to the prior 3D scene model; and
(c) modifying the 3D scene model to be consistent with the image, by:
(i) comparing, by the processor, data of the image with 3D object models of the 3D scene model, resulting in associated data and unassociated data, by:
(A) processing the image to detect image features;
(B) processing each 3D object model in the 3D scene model to detect model features that would be visible;
(C) associating the image features to visible model features of a given 3D object model p when they match at the same or nearby locations and have no better match with visible model features from any other 3D object model q of the 3D scene model;
(D) taking the image features associated with model features of 3D object model p as data associated with 3D object model p;
(ii) using, by the processor, the unassociated data to compute new 3D object models and adding the new 3D object models to the 3D scene model; and
(iii) using, by the processor, the associated data to detect 3D object models in the prior 3D scene model that are absent and removing the absent 3D object models from the 3D scene model;
(d) computing, by the processor, a trajectory that avoids the 3D object models of the 3D scene model;
(e) directing, by the processor, the robotic manipulator to follow the computed trajectory in the scene; and
(f) following, by the robotic manipulator, the trajectory directed by the processor.

5. A method for grasping an object in a scene by a robotic manipulator, based upon and a prior 3D scene model corresponding to the scene in a prior state, the prior 3D scene model comprised of 3D object models corresponding to objects of the scene in the prior state, the method comprising the steps of:
(a) receiving, by a processor, the current image of the scene, wherein the image of the scene is a range image;
(b) initializing, by the processor, the 3D scene model to the prior 3D scene model, wherein each object p of the 3D scene model has a signed distance function; and
(c) modifying the 3D scene model to be consistent with the image, by:
(i) comparing, by the processor, data of the image with 3D object models of the 3D scene model, resulting in associated data and unassociated data by, for each 3D object model p, finding locations in the image such that the value of the signed distance function of the 3D object model p applied to the location is less than or equal to a specified tolerance, and the value of the distance function for all other 3D object models q applied to the location is not less than the value of p's distance function, the data points of these locations being associated data of the 3D object model p, and the data points of any locations not associated with any 3D object model p of the 3D scene model being unassociated data;
(ii) using, by the processor, the unassociated data to compute new 3D object models and adding the new 3D object models to the 3D scene model; and
(iii) using, by the processor, the associated data to detect 3D object models in the prior 3D scene model that are absent and removing the absent 3D object models from the 3D scene model;
(d) computing, by the processor, a grasp of one of the 3D object models of the 3D scene model;
(e) directing, by the processor, the robotic manipulator to grasp the corresponding object in the scene using the computed grasp; and
(f) grasping, by the robotic manipulator, the object directed by the processor using the grasp directed by the processor.

6. A method for grasping an object in a scene by a robotic manipulator, based upon and a prior 3D scene model corresponding to the scene in a prior state, the prior 3D scene model comprised of 3D object models corresponding to objects of the scene in the prior state, the method comprising the steps of:

(a) receiving, by a processor, the current image of the scene;

(b) initializing, by the processor, the 3D scene model to the prior 3D scene model; and (c) modifying the 3D scene model to be consistent with the image, by:

(i) comparing, by the processor, data of the image with 3D object models of the 3D scene model, resulting in associated data and unassociated data by:

(A) rendering each 3D object model p of the 3D scene model, resulting in a rendered image for p; and (B) finding locations in the image such that a first difference between the value of the image data at a location and the value of the rendered image for 3D object model p at the location is less than or equal to a tolerance and for all other 3D object models q, a second difference between the value of the image data at the location and the value of the rendered image for 3D object model q at the location is not less than the first difference, the data points of these locations being associated data of the 3D object model p, and the data points of any locations not associated with any 3D object model of the 3D scene model being unassociated data;

(ii) using, by the processor, the unassociated data to compute new 3D object models and adding the new 3D object models to the 3D scene model; and (iii) using, by the processor, the associated data to detect 3D object models in the prior 3D scene model that are absent and removing the absent 3D object models from the 3D scene model;

(d) computing, by the processor, a grasp of one of the 3D object models of the 3D scene model;

(e) directing, by the processor, the robotic manipulator to grasp the corresponding object in the scene using the computed grasp; and (f) grasping, by the robotic manipulator, the object directed by the processor using the grasp directed by the processor.

7. A method for grasping an object in a scene by a robotic manipulator, based upon and a prior 3D scene model corresponding to the scene in a prior state, the prior 3D scene model comprised of 3D object models corresponding to objects of the scene in the prior state, the method comprising the steps of:

(a) receiving, by a processor, the current image of the scene;

(b) initializing, by the processor, the 3D scene model to the prior 3D scene model; and (c) modifying the 3D scene model to be consistent with the image, by:

(i) comparing, by the processor, data of the image with 3D object models of the 3D scene model, resulting in associated data and unassociated data;

(ii) using, by the processor, the unassociated data to compute new 3D object models and adding the new 3D object models to the 3D scene model; and (iii) using, by the processor, the associated data to detect 3D object models in the prior 3D scene model that are absent by:

(A) rendering the 3D scene model, resulting in a synthetic rendering;

(B) using the synthetic rendering to compute synthetic data associated with 3D object models;

(C) comparing the associated data with the synthetic data associated with objects to find 3D object models in the 3D scene model that do not appear in the image; and (D) determining that a given 3D object model q in the 3D scene model that does not appear in the image is absent from the scene by finding that there is no set of other 3D object models that may be computed from the image that occludes the 3D object model q;

and removing the absent 3D object models from the 3D scene model;

(d) computing, by the processor, a grasp of one of the 3D object models of the 3D scene model;

(e) directing, by the processor, the robotic manipulator to grasp the corresponding object in the scene using the computed grasp; and (f) grasping, by the robotic manipulator, the object directed by the processor using the grasp directed by the processor.

8. A method for grasping an object in a scene by a robotic manipulator, based upon and a prior 3D scene model corresponding to the scene in a prior state, the prior 3D scene model comprised of 3D object models corresponding to objects of the scene in the prior state, the method comprising the steps of:

(a) receiving, by a processor, the current image of the scene;

(b) initializing, by the processor, the 3D scene model to the prior 3D scene model; and (c) modifying the 3D scene model to be consistent with the image, by:

(i) comparing, by the processor, data of the image with 3D object models of the 3D scene model, resulting in associated data and unassociated data, by:

(A) processing the image to detect image features;

(B) processing each 3D object model in the 3D scene model to detect model features that would be visible;

(C) associating the image features to visible model features of a given 3D object model p when they match at the same or nearby locations and have no better match with visible model features from any other 3D object model q of the 3D scene model;

(D) taking the image features associated with model features of 3D object model p as data associated with 3D object model p;

(ii) using, by the processor, the unassociated data to compute new 3D object models and adding the new 3D object models to the 3D scene model; and (iii) using, by the processor, the associated data to detect 3D object models in the prior 3D scene model that are absent and removing the absent 3D object models from the 3D scene model;

(d) computing, by the processor, a grasp of one of the 3D object models of the 3D scene model;

(e) directing, by the processor, the robotic manipulator to grasp the corresponding object in the scene using the computed grasp; and (f) grasping, by the robotic manipulator, the object directed by the processor using the grasp directed by the processor.

9. A system for moving a robotic manipulator in free space to avoid objects in a scene, based upon a prior 3D scene model corresponding to the scene in a prior state, the prior 3D scene model comprised of 3D object models corresponding to objects of the scene in the prior state, the system comprising:
(a) a processor configured to:
(i) receive the current image of the scene, wherein the image of the scene is a range image;
(ii) initialize the 3D scene model to the prior 3D scene model wherein each object p of the 3D scene model has a signed distance function; and
(iii) modify the 3D scene model to be consistent with the image, by:
(A) comparing data of the image with the 3D object models of the 3D scene model, resulting in associated data and unassociated data by, for each 3D object model p, finding locations in the image such that the value of the signed distance function of the 3D object model p applied to the location is less than or equal to a specified tolerance, and the value of the distance function for all other 3D object models q applied to the location is not less than the value of p's distance function, the data points of these locations being associated data of the 3D object model p, and the data points of any locations not associated with any 3D object model p of the 3D scene model being unassociated data;
(B) using the unassociated data to compute new 3D object models and adding the new 3D object models to the 3D scene model;
(C) using the associated data to detect 3D object models in the prior 3D scene model that are absent and removing the absent 3D object models from the 3D scene model;
(iv) compute a trajectory that avoids the 3D object models of the 3D scene model; and
(v) direct the robotic manipulator to follow the computed trajectory in the scene; and
(b) the robotic manipulator configured to follow a trajectory as directed by the processor.

10. A system for moving a robotic manipulator in free space to avoid objects in a scene, based upon a prior 3D scene model corresponding to the scene in a prior state, the prior 3D scene model comprised of 3D object models corresponding to objects of the scene in the prior state, the system comprising:
(a) a processor configured to:
(i) receive the current image of the scene;
(ii) initialize the 3D scene model to the prior 3D scene model; and
(iii) modify the 3D scene model to be consistent with the image, by:
(A) comparing data of the image with the 3D object models of the 3D scene model, resulting in associated data and unassociated data by:
(1) rendering each 3D object model p of the 3D scene model, resulting in a rendered image for p; and
(2) finding locations in the image such that a first difference between the value of the image data at a location and the value of the rendered image for 3D object model p at the location is less than or equal to a tolerance and for all other 3D object models q, a second difference between the value of the image data at the location and the value of the rendered image for 3D object model q at the location is not less than the first difference, the data points of these locations being associated data of the 3D object model p, and the data points of any locations not associated with any 3D object model of the 3D scene model being unassociated data;
(B) using the unassociated data to compute new 3D object models and adding the new 3D object models to the 3D scene model;
(C) using the associated data to detect 3D object models in the prior 3D scene model that are absent and removing the absent 3D object models from the 3D scene model;
(iv) compute a trajectory that avoids the 3D object models of the 3D scene model; and
(v) direct the robotic manipulator to follow the computed trajectory in the scene; and
(b) the robotic manipulator configured to follow a trajectory as directed by the processor.

11. A system for moving a robotic manipulator in free space to avoid objects in a scene, based upon a prior 3D scene model corresponding to the scene in a prior state, the prior 3D scene model comprised of 3D object models corresponding to objects of the scene in the prior state, the system comprising:
(a) a processor configured to:
(i) receive the current image of the scene;
(ii) initialize the 3D scene model to the prior 3D scene model; and
(iii) modify the 3D scene model to be consistent with the image, by:
(A) comparing data of the image with the 3D object models of the 3D scene model, resulting in associated data and unassociated data;
(B) using the unassociated data to compute new 3D object models and adding the new 3D object models to the 3D scene model;
(C) using the associated data to detect 3D object models in the prior 3D scene model that are absent by:
(1) rendering the 3D scene model, resulting in a synthetic rendering;
(2) using the synthetic rendering to compute synthetic data associated with 3D object models;
(3) comparing the associated data with the synthetic data associated with objects to find 3D object models in the 3D scene model that do not appear in the image; and
(4) determining that a given 3D object model q in the 3D scene model that does not appear in the image is absent from the scene by finding that there is no set of other 3D object models that may be computed from the image that occludes the 3D object model q;
and removing the absent 3D object models from the 3D scene model;
(iv) compute a trajectory that avoids the 3D object models of the 3D scene model; and
(v) direct the robotic manipulator to follow the computed trajectory in the scene; and
(b) the robotic manipulator configured to follow a trajectory as directed by the processor.

12. A system for moving a robotic manipulator in free space to avoid objects in a scene, based upon a prior 3D scene model corresponding to the scene in a prior state, the prior 3D scene model comprised of 3D object models corresponding to objects of the scene in the prior state, the system comprising:

(a) a processor configured to:
  (i) receive the current image of the scene;
  (ii) initialize the 3D scene model to the prior 3D scene model; and
  (iii) modify the 3D scene model to be consistent with the image, by:
    (A) comparing data of the image with the 3D object models of the 3D scene model, resulting in associated data and unassociated data, by:
      (1) processing the image to detect image features;
      (2) processing each 3D object model in the 3D scene model to detect model features that would be visible;
      (3) associating the image features to visible model features of a given 3D object model p when they match at the same or nearby locations and have no better match with visible model features from any other 3D object model q of the 3D scene model;
      (4) taking the image features associated with model features of 3D object model p as data associated with 3D object model p;
    (B) using the unassociated data to compute new 3D object models and adding the new 3D object models to the 3D scene model;
    (C) using the associated data to detect 3D object models in the prior 3D scene model that are absent and removing the absent 3D object models from the 3D scene model;
  (iv) compute a trajectory that avoids the 3D object models of the 3D scene model; and
  (v) direct the robotic manipulator to follow the computed trajectory in the scene; and
(b) the robotic manipulator configured to follow a trajectory as directed by the processor.

13. A system for grasping an object in a scene by a robotic manipulator, based upon a prior 3D scene model corresponding to the scene in a prior state, the prior 3D scene model comprised of 3D object models corresponding to objects of the scene in the prior state, the system comprising:
(a) a processor configured to:
  (i) receive the current image of the scene, wherein the image of the scene is a range image;
  (ii) initialize the 3D scene model to the prior 3D scene model, wherein each object p of the 3D scene model has a signed distance function; and
  (iii) modify the 3D scene model to be consistent with the image, by:
    (A) comparing data of the image with the 3D object models of the 3D scene model, resulting in associated data and unassociated data by, for each 3D object model p, finding locations in the image such that the value of the signed distance function of the 3D object model p applied to the location is less than or equal to a specified tolerance, and the value of the distance function for all other 3D object models q applied to the location is not less than the value of p's distance function, the data points of these locations being associated data of the 3D object model p, and the data points of any locations not associated with any 3D object model p of the 3D scene model being unassociated data;
    (B) using the unassociated data to compute new 3D object models and adding the new 3D object models to the 3D scene model;
    (C) using the associated data to detect 3D object models in the prior 3D scene model that are absent and removing the absent 3D object models from the 3D scene model;
  (iv) compute a grasp of one of the 3D object models of the 3D scene model; and
  (v) direct the robotic manipulator to grasp the corresponding object in the scene using the computed grasp; and
(b) the robotic manipulator configured to grasp an object as directed by the processor.

14. A system for grasping an object in a scene by a robotic manipulator, based upon a prior 3D scene model corresponding to the scene in a prior state, the prior 3D scene model comprised of 3D object models corresponding to objects of the scene in the prior state, the system comprising:
(a) a processor configured to:
  (i) receive the current image of the scene;
  (ii) initialize the 3D scene model to the prior 3D scene model; and
  (iii) modify the 3D scene model to be consistent with the image, by:
    (A) comparing data of the image with the 3D object models of the 3D scene model, resulting in associated data and unassociated data by:
      (1) rendering each 3D object model p of the 3D scene model, resulting in a rendered image for p; and
      (2) finding locations in the image such that a first difference between the value of the image data at a location and the value of the rendered image for 3D object model p at the location is less than or equal to a tolerance and for all other 3D object models q, a second difference between the value of the image data at the location and the value of the rendered image for 3D object model q at the location is not less than the first difference, the data points of these locations being associated data of the 3D object model p, and the data points of any locations not associated with any 3D object model of the 3D scene model being unassociated data;
    (B) using the unassociated data to compute new 3D object models and adding the new 3D object models to the 3D scene model;
    (C) using the associated data to detect 3D object models in the prior 3D scene model that are absent and removing the absent 3D object models from the 3D scene model;
  (iv) compute a grasp of one of the 3D object models of the 3D scene model; and
  (v) direct the robotic manipulator to grasp the corresponding object in the scene using the computed grasp; and
(b) the robotic manipulator configured to grasp an object as directed by the processor.

15. A system for grasping an object in a scene by a robotic manipulator, based upon a prior 3D scene model corresponding to the scene in a prior state, the prior 3D scene model comprised of 3D object models corresponding to objects of the scene in the prior state, the system comprising:
(a) a processor configured to:
  (i) receive the current image of the scene;
  (ii) initialize the 3D scene model to the prior 3D scene model; and
  (iii) modify the 3D scene model to be consistent with the image, by:

(A) comparing data of the image with the 3D object models of the 3D scene model, resulting in associated data and unassociated data;
(B) using the unassociated data to compute new 3D object models and adding the new 3D object models to the 3D scene model;
(C) using the associated data to detect 3D object models in the prior 3D scene model that are absent and removing the absent 3D object models from the 3D scene model by:
  (1) rendering the 3D scene model, resulting in a synthetic rendering;
  (2) using the synthetic rendering to compute synthetic data associated with 3D object models;
  (3) comparing the associated data with the synthetic data associated with objects to find 3D object models in the 3D scene model that do not appear in the image; and
  (4) determining that a given 3D object model q in the 3D scene model that does not appear in the image is absent from the scene by finding that there is no set of other 3D object models that may be computed from the image that occludes the 3D object model q;
(iv) compute a grasp of one of the 3D object models of the 3D scene model; and
(v) direct the robotic manipulator to grasp the corresponding object in the scene using the computed grasp; and
(b) the robotic manipulator configured to grasp an object as directed by the processor.

16. A system for grasping an object in a scene by a robotic manipulator, based upon a prior 3D scene model corresponding to the scene in a prior state, the prior 3D scene model comprised of 3D object models corresponding to objects of the scene in the prior state, the system comprising:
(a) a processor configured to:
(i) receive the current image of the scene;
(ii) initialize the 3D scene model to the prior 3D scene model; and
(iii) modify the 3D scene model to be consistent with the image, by:
  (A) comparing data of the image with the 3D object models of the 3D scene model, resulting in associated data and unassociated data by:
    (1) processing the image to detect image features;
    (2) processing each 3D object model in the 3D scene model to detect model features that would be visible;
    (3) associating the image features to visible model features of a given 3D object model p when they match at the same or nearby locations and have no better match with visible model features from any other 3D object model q of the 3D scene model;
    (4) taking the image features associated with model features of 3D object model p as data associated with 3D object model p;
  (B) using the unassociated data to compute new 3D object models and adding the new 3D object models to the 3D scene model;
  (C) using the associated data to detect 3D object models in the prior 3D scene model that are absent and removing the absent 3D object models from the 3D scene model;
(iv) compute a grasp of one of the 3D object models of the 3D scene model; and
(v) direct the robotic manipulator to grasp the corresponding object in the scene using the computed grasp; and
(b) the robotic manipulator configured to grasp an object as directed by the processor.

* * * * *